US011079925B2

(12) United States Patent
Roper et al.

(10) Patent No.: US 11,079,925 B2
(45) Date of Patent: *Aug. 3, 2021

(54) HMI-BASED PATTERN MODIFICATION FOR ROBOTIC PALLETIZING

(71) Applicant: INTELLIGRATED HEADQUARTERS, LLC, Mason, OH (US)

(72) Inventors: Harold Roper, O'Fallon, MO (US); Wesley Hicks, St. Louis, MO (US); James Nicholas Newton, St. Charles, MO (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/839,160

(22) Filed: Apr. 3, 2020

(65) Prior Publication Data

US 2020/0233553 A1 Jul. 23, 2020

Related U.S. Application Data

(63) Continuation of application No. 15/659,924, filed on Jul. 26, 2017, now Pat. No. 10,649,643.

(Continued)

(51) Int. Cl.
*G06F 3/0486* (2013.01)
*B25J 9/16* (2006.01)
(Continued)

(52) U.S. Cl.
CPC .......... *G06F 3/0486* (2013.01); *B25J 9/1671* (2013.01); *B25J 9/1687* (2013.01); *B25J 13/006* (2013.01);

(Continued)

(58) Field of Classification Search
None
See application file for complete search history.

(56) References Cited

U.S. PATENT DOCUMENTS

| 4,641,271 | A | 2/1987 | Konishi et al. |
| 6,082,080 | A | 7/2000 | Holter et al. |
| 8,406,917 | B2 | 3/2013 | Khan et al. |

OTHER PUBLICATIONS

U.S. Appl. No. 15/659,924, filed Jul. 26, 2017, 2018-0032225 A1, Pending.

(Continued)

*Primary Examiner* — Carlos R Ortiz Rodriguez
(74) *Attorney, Agent, or Firm* — Alston & Bird LLP

(57) ABSTRACT

A controller of a material handling system performs a method of creating a multidrop pattern of articles for robotic placement in layers on a pallet. A pattern is presented on a user interface of any currently positioned representations of articles on a pallet. A control affordance for inputting drag'n'drop and numeric inputs is presented on the user interface for robotic control operations to perform a multidrop of the more than one article in an end effector of a robotic arm for placement of the more than one article. User inputs are received that indicate placement position of a first subset of the more than one article. User inputs are received that indicate placement position of a second subset, which is mutually exclusive of the first subset, of the more than one article. The user inputs are converted into a place sequence of robotic control operations to perform a multidrop of the articles by the robotic arm.

20 Claims, 13 Drawing Sheets

Related U.S. Application Data

(60) Provisional application No. 62/366,872, filed on Jul. 26, 2016.

(51) Int. Cl.
   *B25J 13/00* (2006.01)
   *B25J 13/06* (2006.01)
   *G05B 19/409* (2006.01)
   *G06F 3/0488* (2013.01)

(52) U.S. Cl.
   CPC ............ *B25J 13/06* (2013.01); *G05B 19/409* (2013.01); *G06F 3/0488* (2013.01); *G05B 2219/39106* (2013.01); *G05B 2219/40006* (2013.01); *G05B 2219/40007* (2013.01); *G05B 2219/40099* (2013.01)

(56) References Cited

OTHER PUBLICATIONS

Annex to the communication Mailed on Nov. 25, 2020 for EP Application No. 17749278.2, 4 pages.
Communication from the Examining Division dated Nov. 25, 2020 for EP Application No. 17749278.2, 2 pages.
"Operating Manual Palletizing PowerPac RobotStudio 6.02 Document ID: 3HAC042340-001 Revision: H." ABB AB Robotics Products; Vasteras, Sweden; Nov. 4, 2015; retrieved from the internet; <URL: http://search-ext.abb.com/library/Download.aspx?DocumentID=3HAC042340-001&LanguageCode=en&DocumentPartid=&Action=Launch&DocumentRevisionId=H> [retrieved Dec. 4, 2017]; 392 pages.
Applicant Initiated Interview Summary (PTOL-413) dated Mar. 19, 2019 for U.S. Appl. No. 15/659,924.
Cardoso et al., "Automated system for the container loading problem integrating linear programming and automated planning", 2015 IEEE. (Year: 2015).
International Search Report and Written Opinion of International Searching Authority for International Patent Application No. PCT/US2017/043888 dated Dec. 14, 2017, 16 pages.
Non-Final Rejection dated Dec. 14, 2018 for U.S. Appl. No. 15/659,924.
Non-Final Rejection dated Jun. 27, 2019 for U.S. Appl. No. 15/659,924.
Notice of Allowance and Fees Due (PTOL-85) dated Jan. 8, 2020 for U.S. Appl. No. 15/659,924.
Observations by third parties Mailed on Mar. 1, 2019 for EP Application No. 17749278.

700

Intelligrated®    Robot PLC Pick/Place Constants    4/4/2016 10:18:13 AM

Admin    CELL MANUAL/ROBOT STOPPED

| | | |
|---|---|---|
| Pick Rotation Offset Pick Types 101-110 (deg): | 90 | |
| Pick Rotation Offset Pick Types 201-210 (deg): | -90 | |
| Place Rotation Offset (deg): | 90 | |
| Pointer Length (mm): | 185 | |
| Sheet Pick Offset (mm): | 0 | |

Line 1 Pick Conveyor Offset

| | |
|---|---|
| Line 1 Pick Conveyor X Offset (mm): | -50 |
| Line 1 Pick Conveyor Y Offset (mm): | -50 |
| Line 1 Pick Z Offset Min Limit (mm): | -80 |

Line 2 Pick Conveyor Offset

| | |
|---|---|
| Line 2 Pick Conveyor X Offset (mm): | -44 |
| Line 2 Pick Conveyor Y Offset (mm): | 511 |
| Line 2 Pick Z Offset Min Limit (mm): | -80 |

| | |
|---|---|
| Minimum Via Height (mm): | 1100 |
| Maximum Via Height (mm): | 1800 |
| Base Frame Delta (mm): | 180 |

Menu    BACK      SAVE    CANCEL

900 — Robot Tool Constants

Tool Data
CLAMP TOOL SELECTED

Tool Y Offset (mm): 0

Clamp Depth (mm): 130

Number of Clamps: 4

Fixed Blade Thickness: 10

Clamp Lengths
- Clamp 1: 300
- Clamp 2: 300
- Clamp 3: 300
- Clamp 4: 300

Clamp Gaps
- Gap 1-2: 7
- Gap 2-3: 7
- Gap 3-4: 7

Menu | BACK | Robot Tool Sensors | SAVE | CANCEL

FIG. 10

1000 — Robot Tool Constants

Tool Data
VACUUM TOOL SELECTED

Tool Y Offset (mm): 0

Foam Depth (mm): 130

Number of Zones: 4

Vacuum Tool Width: 420

Zone Lengths
- Zone 1: 300
- Zone 2: 300
- Zone 3: 300
- Zone 4: 300

Menu | BACK | Robot Tool Sensors | SAVE | CANCEL

HMI-BASED PATTERN MODIFICATION FOR ROBOTIC PALLETIZING

CROSS-REFERENCE TO RELATED APPLICATIONS

This application is a continuation of U.S. application Ser. No. 15/659,924, filed Jul. 26, 2017, published as U.S. Publication No. 2018/0032225, which claims the benefit of priority under 35 U.S.C. § 119(e) to U.S. Provisional Application Ser. No. 62/366,872 entitled "HMI-based pattern modification for robotic palletizing" filed 26-Jul. -2016, the contents of which are incorporated herein by reference in their entirety.

BACKGROUND

1. Technical Field

The present disclosure relates in general to material handling systems that include robotic palletizing of cartons onto a pallet, and more particularly to systems that allow customizing of a palletizing pattern via a human-machine interface (HMI) for a robotic palletizer.

2. Description of the Related Art

In working environments, like warehouses, factories, or distribution centers, manually placing boxes on pallets is time consuming, complex, and expensive. Further, there is always a risk of damaging, wear and tear associated with dropping of items in manual placement. Thus, conventionally, material handling systems are largely utilized for automating various tasks and handling various items. In this regard, existing material handling systems are able to sort and organize items (e.g. cartons, cases, etc.) stored in such working environments, at high speeds. Typically, this is achieved using both software and hardware support of material handling technology, for instance, by using software or hardwired programmable logic controllers (PLCs) or computing systems that handles and drives hardware robotic palletizing arms that automates picking and placing of the items. Palletizer systems have been developed to facilitate stacking of various items on different stages of pallets from either the conveyer belts or from another locations in an inventory. Some generally-known palletizer systems utilize robotic arms which are driven based on the commands provided by controllers, such as PLCs for picking items and positioning the items on various locations on a pallet.

Generally-known palletizing systems axe pre-loaded with a number of pallet pattern "recipes" that can be selected for a given size of carton or cartons that will stacked on a particular pallet. The patterns can include tie or slip sheets between particular layers to increase stability as well as requirements for shrink wrapping one or more layers. Although many such patterns can be provisioned on the system by an original equipment manufacturer (OEM), customization is often required. For a particular stock keeping unit (SKU), the container such as a carton, shrink wrap, bag, etc., can introduce an unusual shape. Certain manufacturers, distributor, or retailers can have particular logos and markings that are to be positioned on an outside of the stack to facilitate shipping or for direct placement in a retail aisle. In, another scenario, a pallet load can include mixed cases for store replenishment when the particularly selected SKUs are insufficient for a full pallet load per SKU. In other instances, particular SKUs have a given structural integrity, size or frictional characteristic that require positioning within a particular lateral or vertical position. Thus, a human-machine-interface (HMI) is often necessary for creating a new pattern. However, an end user may not have the requisite training and experience to be able to program complicated pick and place movements of the robotic arm.

Another consideration for pattern customization is that time is money. The longer that it takes for the robotic arm to build a pallet load, the less efficient is the material handling system. Consuming additional floor space and capital expenditure into adding more robotic arm stations can have insufficient return on investment. However, resorting to human operators to perform pallet stacking has other downsides. Creating a simplistic one-pick-one-place operation via the HMI can create a slow stacking operation that correspondingly reduces the throughput of the material handling system.

BRIEF SUMMARY

In accordance with the teachings of the present disclosure, a method is provided of creating a multidrop pattern of articles for robotic placement in layers on a pallet. In one or more embodiments, the method includes presenting on a user interface a pattern depiction of any currently positioned representations of articles on a pallet. The method includes presenting on the user interface a control affordance for robotic control operations to perform a multidrop of the more than one article in an end effector of a robotic arm for placement. The method includes receiving a first user input indicating a first placement position of a first subset of the more than one article. The method includes receiving a second user input indicating a second placement position of a second subset, which is mutually exclusive of the first subset, of the more than one article. The method includes converting the first and second user inputs into a place sequence of robotic control operations to perform a multidrop of the more than one article by the robotic arm.

In accordance with embodiments of the present disclosure, a controller includes a user interface device, a device interface in communication with a robotic arm having an end effector, and a processor subsystem in communication with the user interface device and device interface to execute a pattern forming human-machine interface (HMI). The controller presents on a user interface a pattern depiction of any currently positioned representations of articles on a pallet. The controller presents on the user interface a control affordance for robotic control operations to perform a multidrop of the more than one article in an end effector of a robotic arm for placement. The controller receives a first user input indicating a first placement position of a first subset of the more than one article. The controller receives a second user input indicating a second placement position of a second subset, which is mutually exclusive of the first subset, of the more than one article. The controller converts the first and second user inputs into a place sequence of robotic control operations to perform a multidrop of the more than one article by the robotic arm.

According to illustrative embodiments of the present disclosure, a material handling system includes: (i) a pallet support surface; (ii) a case conveyor; (iii) a robotic arm having an end effector and positioned to reach both the pallet support surface and the case conveyor; (iv) a user interface device; and a controller. The controller includes a device interface in communication with a robotic arm having an end effector. The controller includes a processor subsystem in communication with the user interface device and device interface to execute a pattern forming human-machine interface (HMI). The controller presents on a user interface a pattern depiction of any currently positioned representations of articles on a pallet. The controller presents on the user interface a control affordance for robotic control operations to perform a multidrop of the more than one article in an end effector of a robotic arm for placement. The controller receives a first user input indicating a first placement position of a first subset of the more than one article. The controller receives a second user input indicating a second placement position of a second subset, which is mutually exclusive of the first subset, of the more than one article. The controller converts the first and second user inputs into a place sequence of robotic control operations to perform a multidrop of the more than one article by the robotic arm.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 7 illustrates an human-machine-interface (HMI) depiction of a robot constants screen, according to one or more embodiments;

FIG. 9 illustrates an HMI load configurator screen for clamping, according to one or more embodiments;

FIG. 10 illustrates an HMI load configurator screen for vacuum, according to one or more embodiments;

DETAILED DESCRIPTION

Figure 1:
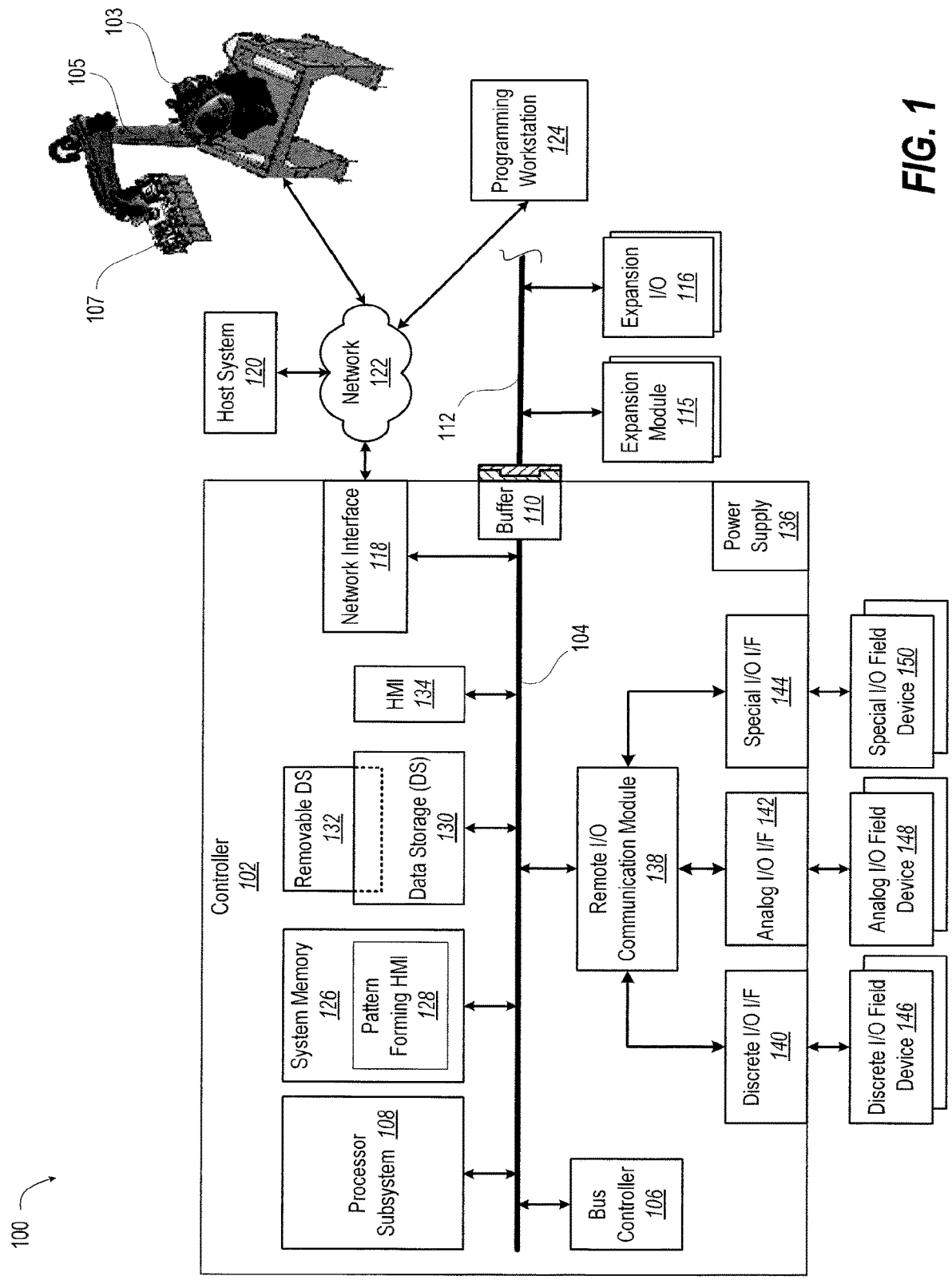
FIG. 1 illustrates a schematic representation a material handling system having a controller that form patterns and converts the patterns to robotic control operations, according to one or more embodiments.

Existing material handling systems utilize various components for automating different tasks which are to be performed in a material handling environment, such as a warehouse, a logistic center, a distribution center, a stock keeping unit (SKU), an inventory or a manufacturing unit. Typically, palletizing or robotic arms are used for picking up different items or commodities and placing it at desired locations. For instance, in some environments, palletizing arms are utilized to pick multiple items from a conveyer system, such as a conveyor belt and placing the items on placement zones, such as pallets or shelves. Also, in many of such environments, placement of such items may be performed depending on rules, such as patterns or in a pre-defined manner. For instance, in some situations, different commodities/items like carton boxes or containers are to be picked by the palletizing arm and are to be placed on conveyor belts in a particular pattern or a sequence. For example, in case where the palletizing arm has to pick two different types of items and place them at left and right lanes on a conveyor belt separately, the palletizing arm functions depending on the pattern or rules instructed for the workflow. In this regard, human machine interfaces (HMI)'s are provided along with processing devices, such as programmable logic controllers (PLCs) for handling operations of palletizing arms and defining patterns or rules. However, in conventional approaches, providing ease of access to an operator while utilizing such HMIs has associated challenges. For that matter, existing HMIs lacks the capability for providing input interface to an operator, wherein an operator can smoothly define patterns, or define configuration parameters for palletizing arms, or provide item picking and placement locations in a lesser turnaround time and using a user-friendly interface.

The present subject matter relates to a material handling system, particularly, a palletizing system, for handling and positioning various items in environments like inventory, warehouse, or manufacturing units. According to various exemplary embodiments described herein, the palletizing system includes a palletizing arm, such as a robotic arm, a human-machine interface (HMI), and a processing unit like a programmable logic controller (PLC) coupled to the palletizing arm and the HMI, for performing various tasks related to placement of items on pallets. In this regard, the human-machine interface comprises an input interface having an input control unit, which may receive inputs pertaining to placement and positioning of items on various location within the environments. The inputs provided on the HMI are accessed by the PLC and processed for providing instructions to the palletizing arm for picking and placing items at desired locations.

According to various embodiments described herein, the HMI may receive multiple types of inputs corresponding to operations of a conveyer system, operations of palletizer arm, and positioning of items on pallets. For instance, according to an exemplary embodiment, the HMI may receive inputs pertaining to patterns indicative of sequence or manner in which various items within the environment are to be positioned on pallets. In this regard, according to one exemplary embodiment, the HMI may receive inputs indicative of various parameters for defining the patterns, for instance, by formulating formulas or rules which are to be processed by the PLC. Alternatively, according to another embodiment of the present subject matter, the HMI may receive inputs pertaining to selection of pre-defined patterns stored in a memory accessible by the PLC. In this regard, the PLC processes the inputs received on the HMI interface and sends commands for programming the palletizing arm and/or a conveyer system for positioning items based on the processed inputs.

In accordance with various example embodiments of the present subject matter described herein, the HMI can also receive inputs pertaining to selection of items to be picked from an input interface of the HMI. In this regard, items or commodities available in a material handling environment which are to be picked are displayed on a display unit of the HMI. Accordingly, an operator can select an item, for instance, by providing a touch based input. In this regard, the operator can select an icon or an image of an item displayed on the display unit of the HMI. Further, the operator can drag the selected icon on the HMI input interface and can drop the selected icon at a desired location corresponding to a placement zone displayed on the HMI display unit. Accordingly, the inputs provided on the HMI interface are accessed by the processing unit or the PLC and are processed by the PLC. The PLC processes the inputs based on which a control unit of the palletizing arm operates the palletizing arm. Thus, the palletizing arm picks the item selected via the HMI interface and places the item on the desired location as provided on the HMI interface. In an example implementation of the embodiment, the HMI input interface is operable to receive inputs pertaining to selection of multiple items in one go, which can be dragged simultaneously, and placed at different locations displayed on the display unit of the HMI. Thus, the HMI as described herein in multiple embodiments hereinafter, by the way of implementation, provides an easy user-friendly interface to the operator for defining patterns for placement of items, and drag and drop multi-pick functionality for positioning different items by the palletizing arm. Further, the PLC coupled to the HMI interface, as described hereinafter, enables programming of the palletizing arm for picking multiple selected items on the HMI interface and placing each of the selected items at desired location defined on the HMI interface, in a single instance.

Existing material handling systems utilize various components for automating different tasks which are to be performed in a material handling environment, such as a warehouse, a logistic center, a distribution center, a stock keeping unit (SKU), an inventory or a manufacturing unit. Typically, palletizing or robotic arms are used for picking up different items or commodities and placing it at desired locations. For instance, in some environments, palletizing arms are utilized to pick multiple items from a conveyer system, such as a conveyer belt and placing the items on placement zones, such as pallets or shelves. Also, in many of such environments, placement of such items may be performed depending on rules, such as patterns or in a pre-defined manner. For instance, in some situations, different commodities/items like carton boxes or containers are to be picked by the palletizing arm and are to he placed on conveyer belts in a particular pattern or a sequence. For example, in case where the palletizing arm has to pick two different types of items and place them at left and right lanes on a conveyer belt separately, the palletizing arm functions depending on the pattern or rules instructed for the workflow. In this regard, human machine interfaces (HMO's are provided along with processing devices, such as programmable logic controllers (PLCs) for handling operations of palletizing arms and defining patterns or rules. However, in conventional approaches, providing ease of access to an operator while utilizing such HMIs has associated challenges. For that matter, existing HMIs lacks the capability for providing input interface to an operator, wherein an operator can smoothly define patterns, or define configuration parameters for palletizing arms, or provide item picking and placement locations in a lesser turnaround time and using a user-friendly interface.

The present subject matter relates to a material handling system, particularly, a palletizing system, tear handling and positioning various items in environments like inventory, warehouse, or manufacturing units. According to various exemplary embodiments described herein, the palletizing system includes a palletizing arm, such as a robotic arm, a human-machine interface (HMI), and a processing unit like a programmable logic controller (PLC) coupled to the palletizing arm and the HMI, for performing various tasks related to placement of items on pallets. In this regard, the human-machine interface comprises an input interface having an input control unit, which may receive inputs pertaining to placement and positioning of items on various location within the environments. The inputs provided on the HMI are accessed by the PLC and processed for providing instructions to the palletizing arm for picking and placing items at desired locations.

According to various embodiments described herein, the HMI may receive multiple types of inputs corresponding to operations of a conveyer system, operations of palletizer arm, and positioning of items on pallets. For instance, according to an exemplary embodiment, the HMI may receive inputs pertaining to patterns indicative of sequence or manner in which various items within the environment are to be positioned on pallets. In this regard, according to one exemplary embodiment, the HMI may receive inputs indicative of various parameters for defining the patterns, for instance, by formulating formulas or rules which are to be processed by the PLC. Alternatively, according to another embodiment of the present subject matter, the HMI may receive inputs pertaining to selection of pre-defined patters stored in a memory accessible by the PLC. In this regard, the PLC processes the inputs received on the HMI interface and sends commands for programming the palletizing arm and/or a conveyer system for positioning items based on the processed inputs.

In accordance with various example embodiments of the present subject matter described herein, the HMI can also receive inputs pertaining to selection of items to be picked from an input interface of the HMI. In this regard, items or commodities available in a material handling environment which are to he picked are displayed on a display unit of the HMI. Accordingly, an operator can select an item, for instance, by providing a touch based input. In this regard, the operator can select an icon or an image of an item displayed on the display unit of the HMI. Further, the operator can drag the selected icon on the HMI input interface and can drop the selected icon at a desired location corresponding to a placement zone displayed on the HMI display unit. Accordingly, the inputs provided on the HMI interface are accessed by the processing unit or the PLC and are processed by the PLC. The PLC processes the inputs based on which a control unit of the palletizing arm operates the palletizing arm. Thus, the palletizing arm picks the item selected via the HMI interface and places the item on the desired location as provided on the HMI interface. In an example implementation of the embodiment, the HMI input interface is operable to receive inputs pertaining to selection of multiple items in one go, which can be dragged simultaneously, and placed at different locations displayed on the display unit of the HMI. Thus, the HMI as described herein in multiple embodiments hereinafter, by the way of implementation, provides an easy user-friendly interface to the operator for defining patterns for placement of items, and drag and drop multi-pick functionality for positioning different items by the palletizing arm. Further, the PLC coupled to the HMI interface, as described hereinafter, enables programming of the palletizing aim for picking multiple selected items on the HMI interface and placing each of the selected items at desired location defined on the HMI interface, in a single instance.

FIG. 1 illustrates a material handling system 100 that provides an exemplary environment within which one or more of the described features of the various embodiments of the disclosure can be implemented. A controller 102 prepares customized patterns converted into robotic commands for a palletizing system 103 that includes a robotic arm 105 with an article engaging end effector 107. The controller 102 can be implemented as a unitary device or distributed processing system. The controller 102 includes functional components that communicate across a system interconnect of one or more conductors or fiber optic fabric that for clarity is depicted as a system bus 104. System bus 104 may include a data bus, address bus, and control bus for communicating data, addresses and control information between any of these coupled units. A bus controller 106 can provide infrastructure management of the system bus 104. Processor subsystem 108 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes including control of automation equipment of a material handling system. The controller 102 may be scalable, such as having a buffer 110 on the system bus 104 that communicatively couples with an expansion bus 112 for communicating and interfacing to expansion modules 115 and expansion input/output (I/O) 116.

In accordance with various aspects of the disclosure, an element, or any portion of an element, or any combination of elements may be implemented with processor subsystem 108 that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executes instructions to effect a result is a processing system Which is configured to perform tasks causing the result, such as by providing instructions to one or more components of the processing system which would cause those components to perform acts which, either on their own or in combination with other acts performed by other components of the processing system would cause the result.

Controller 102 may include a network interface device (NID) 118 that enables controller 102 to communicate or interface with other devices, services, and components that are located external to controller 102, such as a host system 120. Host system 120 can provide scheduling information to the controller 102 such as identification of items being directed to a controlled component and their assigned destination. Host system 120 can provide programming for the controller 102 and obtain diagnostic and status monitoring data. These networked devices, services, and components can interface with controller 102 via an external network, such as example network 122, using one or more communication protocols. Network 122 can be a local area network, wide area network, personal area network, and the like, and the connection to and/or between network and controller 102 can be wired or wireless or a combination thereof. For purposes of discussion, network 122 is indicated as a single collective component for simplicity. However, it is appreciated that network 122 can comprise one or more direct connections to other devices as well as a more complex set of interconnections as can exist within a wide area network, such as the Internet or on a private intranet. For example, a programming workstation 124 can remotely modify programming or parameter settings of controller 102 over the network 122. Various links in the network 122 can wired or wireless.

System memory 126 can be used by processor subsystem 108 for holding functional components such as data and software such as a pattern forming HMI 128 that is retrieved from data storage 130. Data and software can be provided to the controller 102 or exported from the controller 102 via removable data storage (RDS) 132. Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, function block diagram (FBD), ladder diagram (LD), structured text (ST), instruction list (IL), and sequential function chart (SFC) or otherwise. The software may reside on a computer-readable medium.

For clarity, system memory 126 is random access memory, which may or may not be volatile, and data storage 130 is generally nonvolatile. System memory 126 and data storage 130 contain one or more types of computer-readable medium, which can be a non-transitory or transitory. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Certain manual interactions and indications can also be provided via a human-machine interface (HMI) 134 that is integral or connected to the controller 102. HMI can be formed of one or more devices that provides input and output functions such as via a touch screen graphical display, keypad, microphone, speaker, haptic device, camera, gauges, light indicators, dials, switches, etc. A power supply 136 provides regulated voltages at required levels for the various components of the controller 102 and can draw upon facility power.

A remote I/O communication module 138 can provide communication protocol for handling of various inputs and outputs between the system bus 104 and controller interfaces such as a discrete I/O interface/s 140, analog I/O interfaces 142, and special I/O interfaces 144. Each interface 140, 142, 144 can provide as necessary analog-to-digital or digital-to-analog conversion, signal processing, buffering, encoding, decoding, etc., in order to communicate with discrete, analog, or special I/O field devices 146, 148, 150, respectively.

Figure 2:
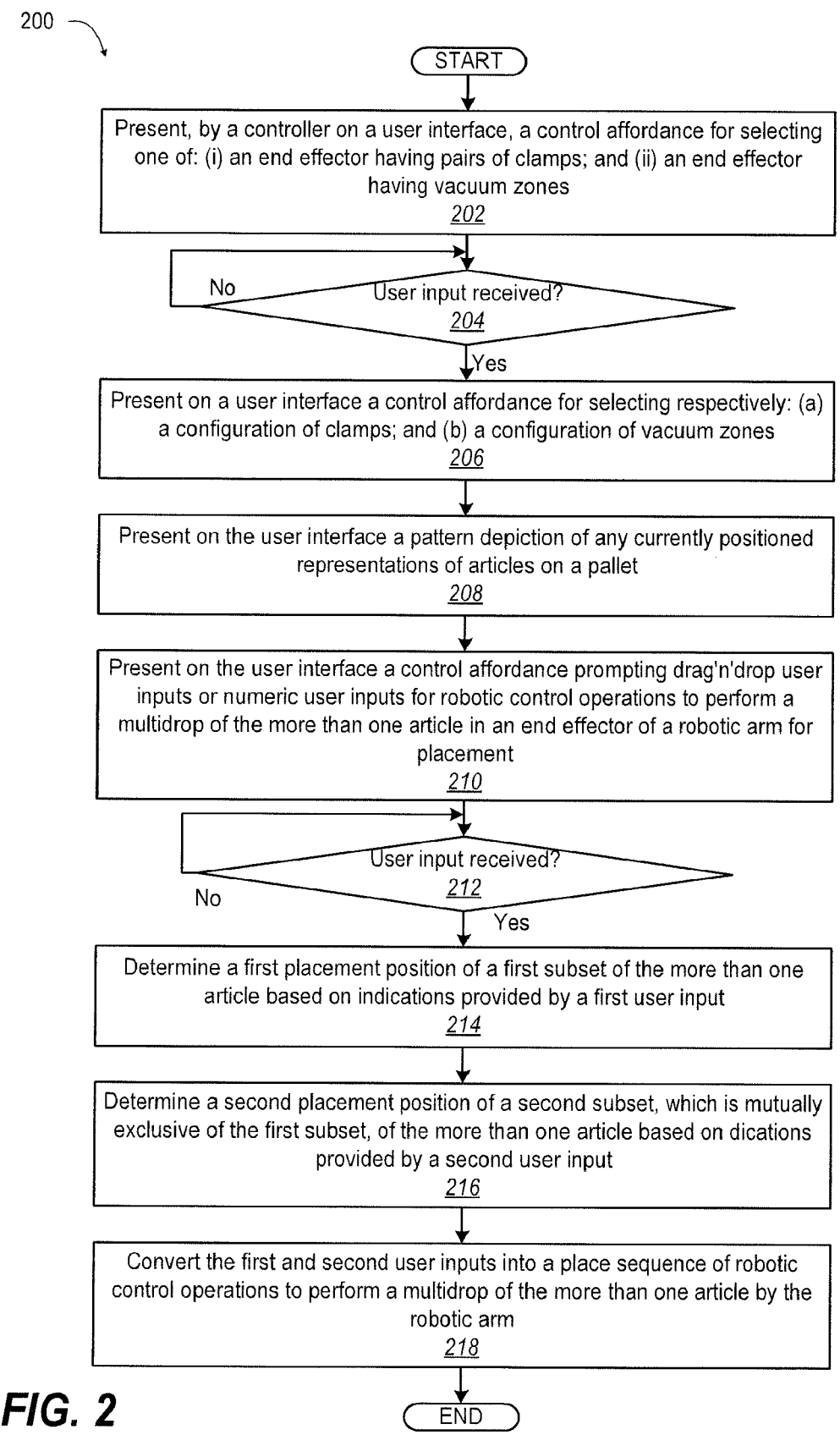
FIG. 2 illustrates a flow diagram of a method of creating a multidrop pattern of articles for robotic placement in layers on a pallet, according to one or more embodiments.

FIG. 2 illustrates a method 200 of creating a multidrop pattern of articles for robotic placement in layers on a pallet. In one or more embodiments, method 200 begins presenting, by a controller on a user interface, a control affordance for selecting one of: (i) an end effector having pairs of clamps; and (ii) an end effector having vacuum zones (block 202). A determination is made as to whether a user input is received (decision block 204). In response to determining that a user input is not received, the controller repeats decision block 204 to continue waiting. In response to receiving an end effector user input, the controller presents on a user interface a control affordance for selecting respectively: (a) a configuration of clamps; and (b) a configuration of vacuum zones (block 206). Method 200 includes presenting on the user interface a pattern depiction of any currently positioned representations of articles on a pallet (block 208). Method 200 includes presenting on the user interface a control affordance prompting drag'n'drop user inputs or numeric user inputs for robotic control operations to perform a multidrop of the more than one article in an end effector of a robotic arm for placement (block 210). The numeric user inputs may be vector-based, directional, relative, etc. A determination is made as to whether a user input is received, interacting with the control affordances (decision block 212). In response to determining that a user input is not received, the controller repeats decision block 212 to continue waiting. In response to determining that a user input is received, method 200 includes determining a first placement position of a first subset of the more than one article based on indications provided by a first user input (block 214). Method 200 includes determining a second placement position of a second subset, which is mutually exclusive of the first subset, of the more than one article based on dications provided by a second user input (block 216). Method 200 includes converting the first and second user inputs into a place sequence of robotic control operations to perform a multidrop of the more than one article by the robotic arm (block 218). Then method 200 ends.

Figure 3:
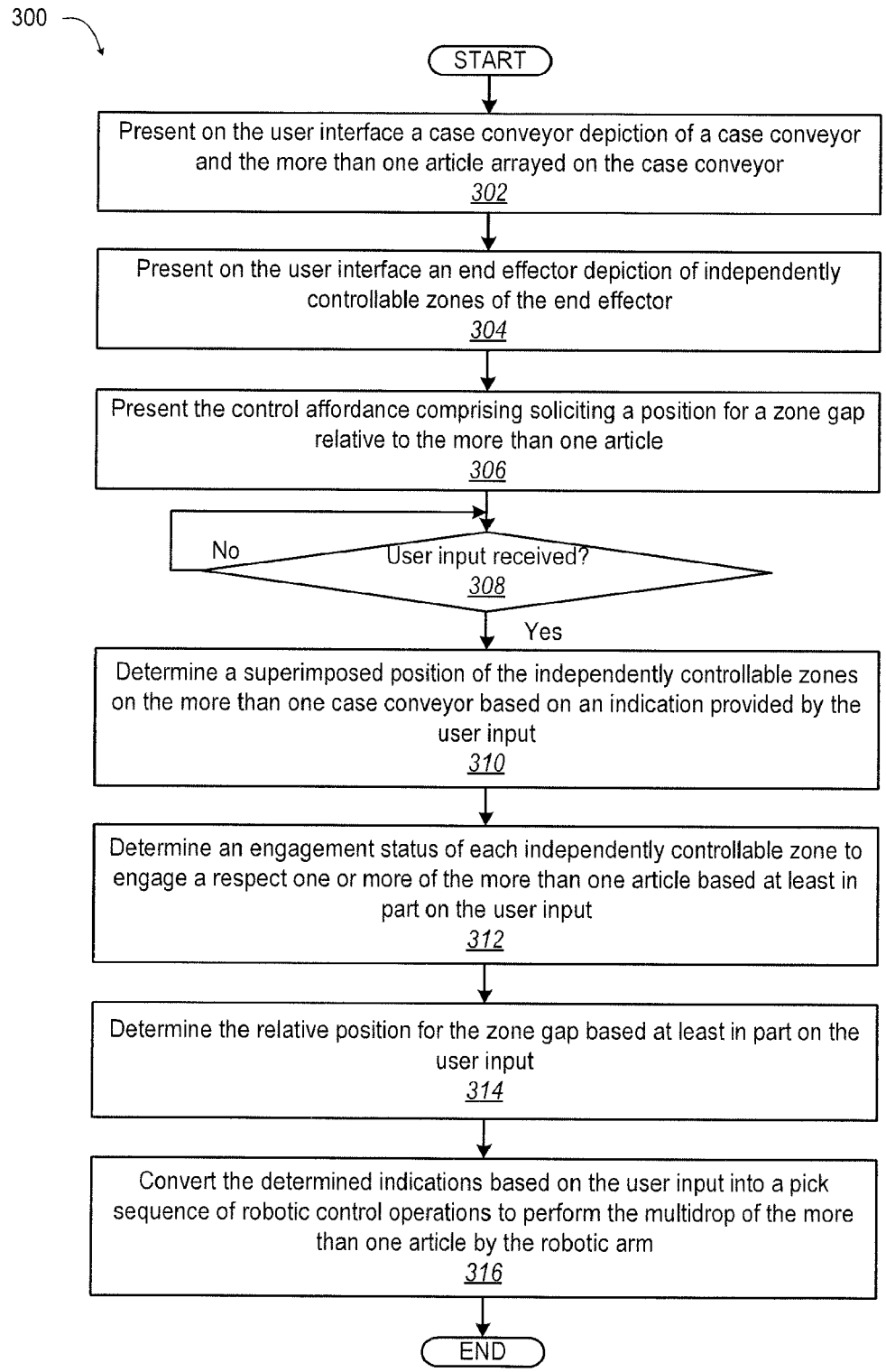
FIG. 3 illustrates a flow diagram of a method of customizing a pick operation of an end effector of the robotic arm, according to one or more embodiments.

FIG. 3 illustrates a method 300 of customizing a pick operation of an end effector of the robotic arm. In one or more embodiments, method 300 begins presenting on the user interface a case conveyor depiction of a case conveyor and the more than one article arrayed on the case conveyor (block 302). Method 300 includes presenting on the user interface an end effector depiction of independently controllable zones of the end effector (block 304). Method 300 includes presenting the control affordance comprises soliciting a position for a zone gap relative to the more than one article (block 306). A determination is made as to whether a user input is received (decision block 308). In response to determining that a user input is not received, the controller repeats decision block 306 to continue waiting. In response to receiving a user input, the controller determines a superimposed position of the independently controllable zones on the more than one case conveyor based on an indication provided by the user input (block 310). Method 300 includes determining an engagement status of each independently controllable zone to engage a respect one or more of the more than one article based at least in part on the user input (block 312). Method 300 includes determining the relative position for the zone gap based at least in part on the user input (block 314). Controller converts the determined indications based on the user input into a pick sequence of robotic control operations to perform the multidrop of the more than one article by the robotic arm (block 316). Then method 300 ends.

Figure 4:
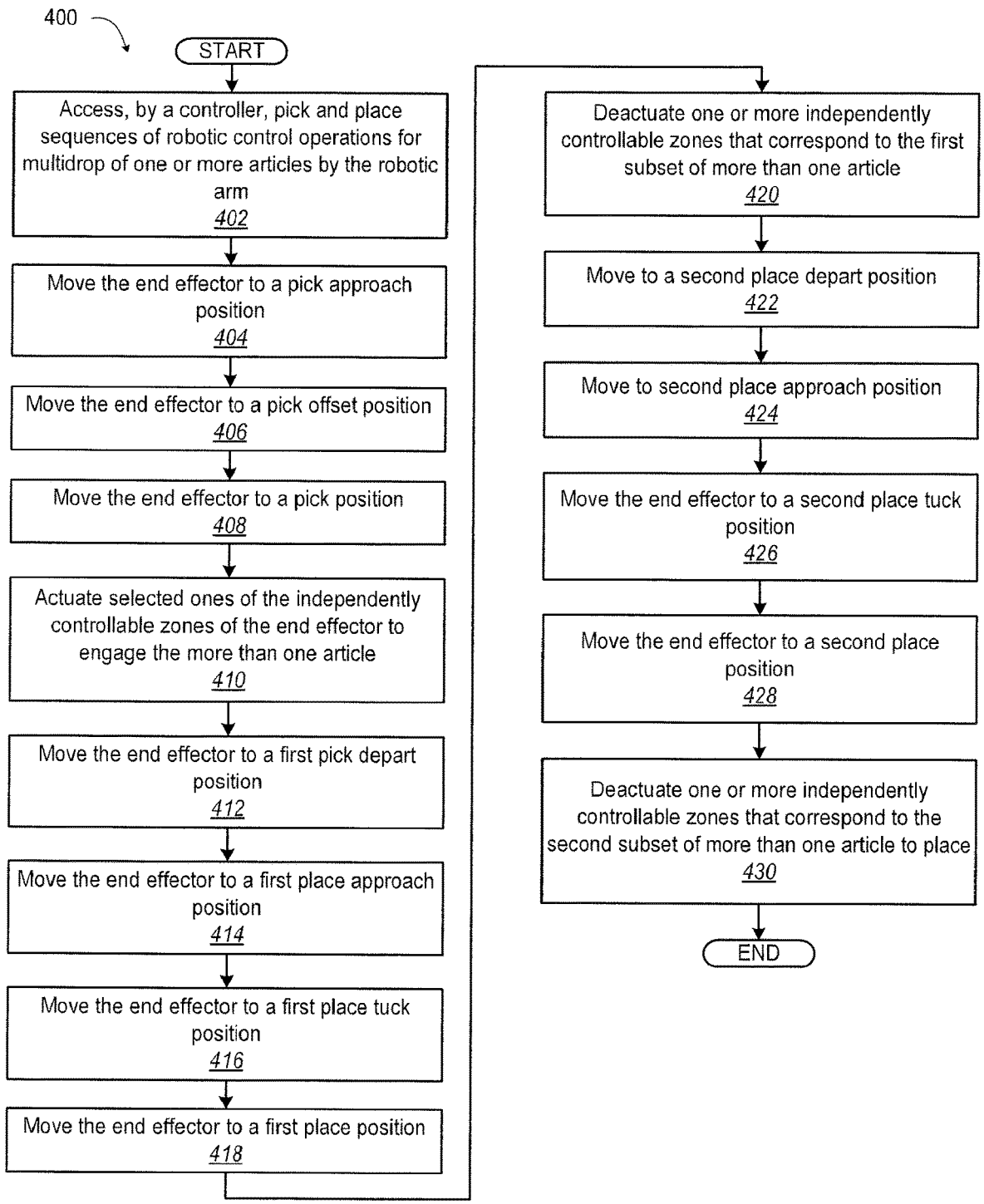
FIG. 4 illustrates a flow diagram of a method of forming a palletized load of articles such as cartons or cases based upon a user-customized pattern, according to one or more embodiments.

FIG. 4 illustrates a method 400 of forming a palletized load of articles such as cartons or cases based upon a user-customized pattern. In one or more embodiments, method 400 begins accessing, by a controller, pick and place sequences of robotic control operations for multidrop placement of articles by the robotic arm (block 402). Method 400 includes moving the end effector to a pick approach position (block 404). Method 400 includes moving the end effector to a pick offset position (block 406). Method 400 includes moving the end effector to a pick position (block 408). Method 400 includes actuating selected ones of the independently controllable zones of the end effector to engage the more than one article (block 410). Method 400 includes moving the end effector to a first pick depart position (block 412). Method 400 includes moving the end effector to a first place approach position (block 414). Method 400 includes moving the end effector to a first place tuck position (block 416). Method 400 includes moving the end effector to a first place position (block 418). Method 400 includes deactuating one or more independently controllable zones that correspond to the first subset of more than one article (block 420). Method 400 includes moving to a second place depart position (block 422). Method 400 includes moving to second place approach position (block 424). Method 400 includes moving the end effector to a second place tuck position (block 426). Method 400 includes moving the end effector to a second place position (block 428). Method 400 includes deactuating one or more independently controllable zones that correspond to the second subset of more than one article to place (block 430). Method 400 ends.

In the above described flow chart of FIGS. 2-4, one or more of the methods may be embodied in an automated controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implemented, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

A palletizing robot has two primary tasks. To "pick" up one or more cases and "places" those cases on a pallet or slip sheet in the correct pattern. The robot needs to be told where to pick up cases, how many to pick as well as where to place and how many places. In an exemplary embodiment, a palletizing robot programming tool is based on having only the basic program in the robot controller. A PLC defines the points that robot moves the tool to and at what speed. The PLC instructs the robot through the use of variables in the robot code over Ethernet based primarily on the case size and pattern. The other feature of this software tool is the defining of "user frames" for each of the pick and build stations to let the robot and the PLC know where to move to pick and place cartons.

The software system is designed to work primarily on clamp tools, vacuum tools or fork tool for picking up the eases/boxes/totes for single drop or multidrop placement of the cases onto the pallet. The Load can be created by using template place position based formulas or by manually using drag drop method or using tuning arrows. The layer created using place position formulas is called as 'Template Based Layer' and the load created using manually (drag-drop) method is called as 'Pattern Based Layer'. The software is able to detect the dropped cases from the robot tool or box collision, as well as for each pick position or place position different speed can be assigned to the robot. Search function allows user to check available load configuration for user entered case dimensions. IntelliGen works with Fanuc, Motoman, or Kuka robot without any major modification on PLC side.

In one or more embodiments, a palletizing system includes an interface unit that has: (i) an input control unit; (ii) a display unit coupled to the input control unit; (iii) a processing unit coupled to the interface unit; and (iv) a palletizing arm. The processing unit: (a) receives inputs on the input control unit, wherein the inputs corresponds to patterns indicative of placement of items on an item placement zone; (b) displays on the display unit, the pattern received by the processing unit; (c) receives item-location inputs via the input control unit, wherein the item-location inputs corresponds to: (1) selection of at least one item from amongst multiple items displayed on the display unit, wherein the multiple items corresponds to items to be placed by the palletizing system; and (2) an item placement locations for placing the at least selected item via a palletizing arm. The item-location inputs are to be provided via the input control unit by dragging an image of the item displayed on the display screen to the item placement location, based on an item placement pattern displayed on the display unit. The palletizing arm is coupled to the interface unit, the palletizing arm configured to pick the items and place the items on a corresponding item placement location based on inputs received by the processing unit.

In one or more embodiments, the processing unit of the palletizing system is to self-optimize the patterns to provide automated adjustment for accommodating plurality of items on an item placement zone, upon change in dimensions of the at least one selected item.

In one or more embodiments, the processing unit of the palletizing system is to receive the inputs corresponding to the patterns for placement of items based on at least one of (a) drawing a pattern via the input control unit and/or (b) receiving pattern defining parameters and attributes corresponding to the pattern defining parameters, wherein the patterns are defined using rules based on the pattern defining parameters and associated attributes.

In one or more embodiments, the processing unit of the palletizing system is to receive inputs via the input control unit to: (i) select plurality of item images displayed on the display unit; and (ii) define plurality of item locations for placing the plurality of selected items corresponding to the item images. The palletizing arm picks the plurality of items together and place each item from amongst the plurality of items at the plurality of items respectively.

In one or more embodiments, the processing unit of the palletizing system is to receive the inputs corresponding to the patterns for placement of items based on at least one of (a) drawing a pattern via the input control unit; or (b) receiving pattern defining parameters and attributes corresponding to the pattern defining parameters. The patterns are defined using rules based on the pattern defining parameters and associated attributes.

In one or more embodiments, a palletizing interface unit includes: (i) an input control unit; (ii) a display unit coupled to the input control unit; and (iii) a processing unit coupled to the input control unit and the display unit. The processing unit is to: (i) receive items-location inputs via the input control unit, wherein the item-location inputs corresponding to: (a) dimensions associated with at least two items; and (b) at least two item placement locations for placing the at least two items at respective item placement locations via a palletizing arm. The item-location inputs are provided based on an item placement pattern displayed on the display unit.

In one or more embodiments, the processing unit of the palletizing interface unit receives inputs on the input control unit. The inputs correspond the item placement pattern indicative of placement of items on an item placement zone. The processing unit can be a programmable logic controller (PLC) coupled to the input control unit.

In one or more embodiments, the present disclosure provides a method that includes receiving inputs on an input control unit corresponding to an input interface of a palletizer system. The inputs corresponds to patterns indicative of placement of items on an item placement zone by a palletizing arm of the palletizer system. The method includes displaying on a display unit of the palletizer system, the pattern received via the input control unit. The method includes receiving item-location inputs via the input control unit, wherein the item-location inputs corresponds to: (a) selection of at least one item from amongst multiple items displayed on the display unit; and (b) item placement locations for placing the at least one selected item via the palletizing arm. The item-location inputs are provided via the input control unit by dragging an image of the item displayed on the display screen to the item placement location, based on an item placement pattern displayed on the display unit. The method includes processing, by a processing unit of the palletizer system, the patterns and the item location inputs received on the input interface and accessed by the processing unit. The method includes placing the items picked by the palletizing arm on a corresponding item placement location based on inputs received on the input interface upon receiving control instructions at the palletizing arm by the processing unit.

In one or more embodiments, the method includes placing of the items by picking the items together, by the palletizing arm and placing each item from amongst the items at the corresponding items locations respectively. The method includes receiving the inputs corresponding to patterns is based on at least one of: (a) drawing a pattern via the input control unit; or (b) receiving pattern defining parameters and attributes corresponding to the pattern defining parameters. The patterns are defined using rules based on the pattern defining parameters and associated attributes References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

With regard to robot/tool configuration, the software tool is designed to work with clamp tools, or vacuum tools or fork tools up to twenty (20) clamps/zones/fork. The number of clamps or vacuum zones on a tool will vary by project. A fixed blade is the one side of the tool that does not move. For the purposes of defining clamps; the fixed blade is on a left side, when facing away from the robot base, with the tool at zero degrees (0°). If the fixed blade is on left hand side standing at an infeed conveyor and facing towards the robot, then the pick type is Left Side Pick. If the fixed blade is on right side standing at robot base and facing towards infeed conveyor, then the pick type is Right Side Pick.

The depth (height) of the damps is assumed to be the same for all clamps. The length (width) of each clamp is individually configurable. This data is required for the IntelliGen software configuration. For the purposes of device naming and input/output (I/O) mapping, the clamps are numbered; starting from the most upstream clamp and counting toward the end of the tool, with the fixed blade on the left. If the fixed blade is on the right, the clamps are numbered starting from the most downstream clamp and counting against the infeed direction. The tool center point is defined for the robot by mounting a tool pointer to the center of the fixed blade. The tip of the tool pointer will be in line with the belting that lines the inside edge of the fixed blade.

KUKA Robotics uses the term Base Frame for user defined bases. Motorman and Fanuc robots use the term User Frame. Axis definition for all robots is as follows:
  X=−in/+out horizontally in relation to the robot base. (0 is robot base center),
  Y=−left/+right horizontally in relation to the robot base. (0 is the center point in front of the robot);
  Z=+up/−down vertically in relation to the robot base. (0 is directly out from the base of the robot)
  A value of x, y, z (in millimeters) can identify any point in space within reach of the robot.

Case Conveyor Base: Facing the case conveyor looking upstream, the base frame(s) will be the near right hand corner of the conveyor. The corner will be the junction of the end plate and the side frame or as close as possible. The X axis will be the side of the conveyor; the Y axis will be the end of the conveyor and Z will be the height of the conveyor. A jig that rests on the conveyor, square with the end and side frames, is the preferred method of teaching the base frame. The jig is placed on the conveyor to insure alignment with side and end frames. Holes in the jig (P1, P2, and P3) are used to accurately position the pointer for at the origin, X, Y and Z axis.

Pallet Build Conveyor Base: Facing the pallet build conveyor looking upstream, the base frame(s) will be the near right hand corner of the conveyor. A jig that rests on the conveyor, square with the end and side frames, is a method of teaching the base frame. Similar to the case conveyor jig, punch marks in the pallet jig are used to accurately position the pointer for at the origin, X, and Y axis.

Pick and Place Sequence: A pick is the action of the robot moving to the case conveyor, picking up cases in the tool, and moving to the Pick Depart position. The entire sequence of picking up cases and placing them on the build location is occasionally referred to as a pick. A place is the action of the robot moving to the place position and placing cases onto the load being built.

Operation Sequence: The general sequence of operation for a pick sequence is as follows:
  (i) Move to Pick Approach Position;
  (ii) Move to Pick Offset Position;
  (iii) Move to Pick Position (slower speed);
  (iv) Close Clamps;
  (v) Move to Pick Depart Position;
  (vi) Move to Place Approach Position;
  (vii) Move to Place Tuck Position;
  (viii) Move to Place Position (slower speed);
  (ix) Open Clamps;
  (x) Move to Place Depart Position;
  (xi) If multidrop is active, move to next place approach;
  (xii) Move to Place Tuck Position or Depart distance position;
  (xiii) Move to Place Position (slower speed);
  (xiv) Open Clamps;
  (xv) Move to Place Depart Position; and
  (xvi) If new Pick not available then move to idle.

Sequences that require double or triple drops will have additional moves added to the sequence.

Pattern Data: Cases per Layer refers to the number of cases that will be required to complete the layer of a new load being built. Picks per layer refers to the number of pick sequences that will be required to complete the layer of a new load. Places per layer refers to the number of place sequences that will be required to complete the layer of a new load. Overhang refers to the distance (millimeters) that the most upstream clamp in a pick will extend beyond the last case used in the pick. Overhang range can be from (−50 mm) to (50 mm). Negative overhang values will result in the clamp further downstream of the last case in the pick. Depart Distance refers to the distance (millimeters) that the robot will move up for next place position. Depart Distance is used for multidrop sequences, if set to zero the depart distance will be such that the bottom of the case will be 50 mm above the top layer. If the move does not require any rotation or an adjacent shift you can specify to limit the depart height so the case or clamp does not move above the layer height.

Pick Type: Cases can be picked from the case conveyor with the fixed blade in the standard position on the left, or they can be picked with the tool rotated 180° thus orienting the fixed blade on the right. Cases can also be picked with different clamp configurations. This configuration refers to the clamp that starts the pick. The clamp is either the most upstream clamp or the most downstream clamp of the tool in the current position (standard 0° or rotated 180°). The combination of the fixed blade position and the clamping configuration is referred to as the Pick Type. Available pick types for a particular system are a function of the number of clamps available on the robot tool.

Left Side Pick types are used to define picks with the tool fixed blade on the left hand side, when facing towards the case flow direction. Right Side Pick types are used to define picks with the tool fixed blade on the right hand side, when facing towards the case flow direction. For downstream left/right pick, the tool will be positioned such that the tool is as far downstream as possible with the current cases defined for the pick. For upstream left/right pick, the tool will be positioned such that the tool does not extend further then the end of the pick conveyor. This option can be used if there is concern for tool interference with the base of the robot.

Most accurate corner: When the robot picks product, the intersection of the fixed blade and the end stop of the conveyor is the most accurate position of the pick. This position becomes the most accurate corner. This corner is used to determine rotation, X axis value, and Y axis value for the place positions.

Clamp Gap is used to define the position of the tool in relation to the pick. When a clamp gap is defined it will move the gap to the end of the pick or the defined case split selection.

The Case split is used to define the location of the tool in relation to the clamp gap. When a clamp gap is defined you can move that gap to a specific split of the cases. This is used to define a multidrop pick option.

Consider for example a two-case pick for left side pick type with downstream. The fixed blade is on the left side position. Given that there are three cases on the conveyor, two will be picked. The downstream option means that the first clamp of the tool (counting from most upstream toward the robot) is on the most upstream case of the pick. The PLC will calculate the remaining clamps to be used for the pick.

Consider for example of a two-case pick using clamp gap 1-2 for left side downstream pick type with negative overhang distance. The fixed blade is on the left side with downstream position. There are three cases on the conveyor, two will be picked. Clamp Gap 1-2 means that the second clamp of the tool (counting from most upstream toward the robot) is on the most upstream case of the pick with negative overhang distance value. The PLC will calculate the remaining clamps to be used for the pick.

Consider an example of a two case pick using clamp gap 1-2 for left side downstream pick type with positive overhang distance. The fixed blade is on the left side with downstream position. There are three cases on the conveyor, two will be picked. Clamp Gap 1-2 means that the second clamp of the tool (counting from most upstream toward the robot) is on the most upstream case of the pick with positive overhang distance value. The PLC will calculate the remaining clamps to be used for the pick.

Consider for example a two-case pick using clamp gap 2-3 for left side downstream pick type. The fixed blade is on the left side with downstream position. There are three cases on the conveyor, two will he picked. Clamp Gap 2-3 means that the third clamp of the tool (counting from most downstream away from the robot) is on the most upstream case of the pick. The PLC will calculate the remaining clamps to be used for the pick.

Consider for example a two-case pick using clamp gap 2-3 and case split 1-2 for left side downstream pick type. The fixed blade is on the left side with downstream position. There are three eases on the conveyor, two will be picked. Clamp Gap 2-3 means that the gap between clamp 2 and 3 of the tool (counting from most upstream clamp towards the robot) is on the case split between 1 and 2 of the pick. Case Split 1-2 referred to the split between case 1 and 2. The PLC will calculate the remaining clamps to be used for the pick.

Consider an example of a two-case pick using left side upstream pick type. The fixed blade is on the left hand side with upstream position. There are three cases on the conveyor, two will he picked. The first clamp of the tool (counting from most downstream stream away from the robot) is on the most downstream case of the pick. The PLC will calculate the remaining clamps to be used for the pick.

Consider an example of a three-case pick using left side pick with downstream. The fixed blade is on the left hand side with downstream position. There are four cases on the conveyor, three will be picked. The first clamp of the tool (counting from most upstream toward the robot) is the clamp on the most upstream case of the pick. The PLC will calculate the remaining clamps to be used for the pick.

Note that the left side downstream pick type is regardless of the cases per pick value. The only difference between the 2 case pick (Example 0) and 3 case pick is the number of clamps used.

Consider an example of a three case pick using left side pick with upstream. The fixed blade is on the left hand side with upstream position. There are four cases on the conveyor, three will be picked. The first clamp of the tool (counting from most downstream stream away from the robot) is the clamp on the most downstream case of the pick. The PLC will calculate the remaining clamps to be used for the pick.

Note that the left side upstream pick type is regardless of the cases per pick value. The only difference between the 2 cases pick (Example 0) and 3 case pick is the number of clamps used.

Consider an example for a two-case pick using right side pick type. The fixed blade is rotated 180°, it's on right hand side. There are three cases on the conveyor, two will be picked. The first clamp of the tool (counting from most upstream toward the robot) is the clamp on the most upstream case of the pick. The PLC will calculate the remaining clamps to be used for the pick. Add Overhang distance, if needed.

Consider an example of a two-case pick using clamp gap 1-2 for right side downstream pick type with negative overhang distance. The fixed blade is on the right hand side with downstream position. There are three cases on the conveyor, two will he picked. Clamp Gap 1-2 means that the second clamp of the tool (counting from most upstream toward the robot) is the clamp on the most upstream case of the pick with negative overhang distance value. The PLC will calculate the remaining clamps to be used for the pick.

Consider an example of a two-case pick using clamp gap 1-2 for right side downstream pick type with negative overhang distance. The fixed blade is on the right hand side with downstream position. There are three cases on the conveyor, two will be picked. Clamp Gap 1-2 means that the second clamp of the tool (counting from most upstream toward the robot) is on the most upstream case of the pick with positive overhang distance value. The PLC will calculate the remaining clamps to be used for the pick.

Consider an example of a two-case pick using clamp gap 2-3 for right side downstream pick type. The fixed blade is on the right side with downstream position. There are three cases on the conveyor, two will be picked. Clamp Gap 2-3 means that the third clamp of the tool (counting from most upstream toward the robot) is on the most upstream case of the pick. The PLC will calculate the remaining clamps to be used for the pick.

Consider an example of a two-case pick using clamp gap 2-3 for right side downstream pick type. The fixed blade is on the right side with downstream position. There are three cases on the conveyor, two will be picked. Clamp Gap 2-3 means that the third clamp of the tool (counting from the most upstream away from the robot) is on the most upstream case of the pick. The PLC will calculate the remaining clamps to be used for the pick.

Consider an example of a two case pick using right side upstream pick type. The fixed blade is on the right hand side with upstream position. There are three cases on the conveyor, two will be picked. The first clamp of the tool (counting from most downstream stream away from the robot) is on the most downstream case of the pick. The PLC will calculate the remaining clamps to be used for the pick.

X and Y Positions: When a pick is made the robot will move the tool to the build pallet in such a way that the most accurate corner (Section 0) is lined up with the (0, 0, 0) coordinate of the build pallet and the fixed blade is lined up along the right edge of the pallet. The most accurate corner is placed at (0, 0, 0) on the pallet and the fixed blade is along the right edge of the pallet. For a right side pick type, the most accurate corner is placed at (0, 0, 0) on the pallet and the fixed blade is along the right edge of the pallet. The X and Y Position coordinates represent the position coordinates that the most accurate corner of the pick will be placed on the pallet.

Rotation: The rotation value represents the rotation necessary to turn the pick, relative to the most accurate corner, in order to place the fixed blade in the desired location. For example, if the pick needs to be rotated horizontal, and the fixed blade must be to the outside of the pallet, then the pick must be rotated −90° about the most accurate corner, Z Axis. If the pick needs to be rotated horizontal, and the fixed blade must be to the outside of the pallet, then the pick must be rotated −90° about the most accurate corner, Z Axis.

Tuck represents the direction the robot will tuck, or slide, the pick into the load during the place operation. Tuck is used to close up gaps between cases during the build. The tuck direction is represented by an integer value. As a convention, the direction 1 is always in the direction of the positive X axis of the base and thus the direction 7 is always in the direction of the positive Y axis of the base. Zero indicates no tuck.

Multidrop refers to the scenario where cases are picked for more than one place. For example; four cases may be picked to drop at two places of two cases each. The system data structure has provisions for entering multidrop position values. Multidrop will add additional moves to the standard place sequence (Section 0) since multiple place motions will be required.

Figure 5:
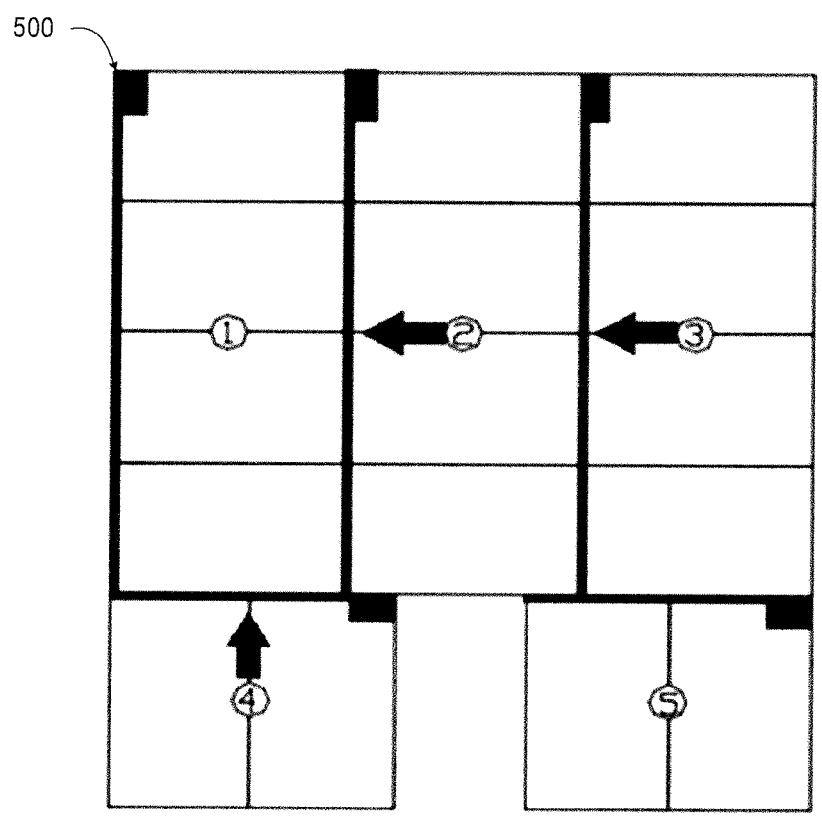
FIG. 5 illustrates a diagram of an example pattern, according to one or more embodiments.

AutoCAD templates are developed to allow engineers to quickly and accurately develop the necessary pattern data. FIG. 5 illustrates an example pattern 500. Pattern drawings are developed in AutoCAD and show the pattern formation, pick placements, cases, and pick data. Pick data is displayed in table format in TABLE A.

TABLE A

| Pick # | Place # | First Case | Last Case | Depart Distance | OH | ROT | Tuck |
|---|---|---|---|---|---|---|---|
| 1 | 1 | 1 | 4 | 0 | 0 | 0 | |
| 2 | 2 | 1 | 4 | 0 | 0 | 0 | |
| 3 | 3 | 1 | 4 | 0 | 0 | 0 | |
| 4 | 4 | 1 | 2 | 50 | 0 | −90° | |
| 5 | 5 | 3 | 4 | 0 | 0 | −90° | |

Pick # represents the pick number. This is the sequence followed when forming the layer. Place # represents the place number. C# is the number of eases in the pick. First Case is the case number which is going to be first case for the place number. Last Case is the case number which is going to be last case for the place number. Depart Distance is the amount of distance that robot will depart for next place position. OH is the amount of overhang. ROT is the rotation of the place position. TUCK represents the direction of the final place move. The T and S are added if the infeed conveyor has a case turner. S stands for straight cases and T stands for turned cases. An R can also be added if the infeed conveyor has a row former. RT or RS will added if the pick is two rows. Picks are illustrated by use of a pick block. A straight polyline illustrates the fixed blade position. An attached polyline box represents the most accurate corner of the pick. The most accurate corner is also the reference point for the placement of the pick in the layer.

Figure 6:
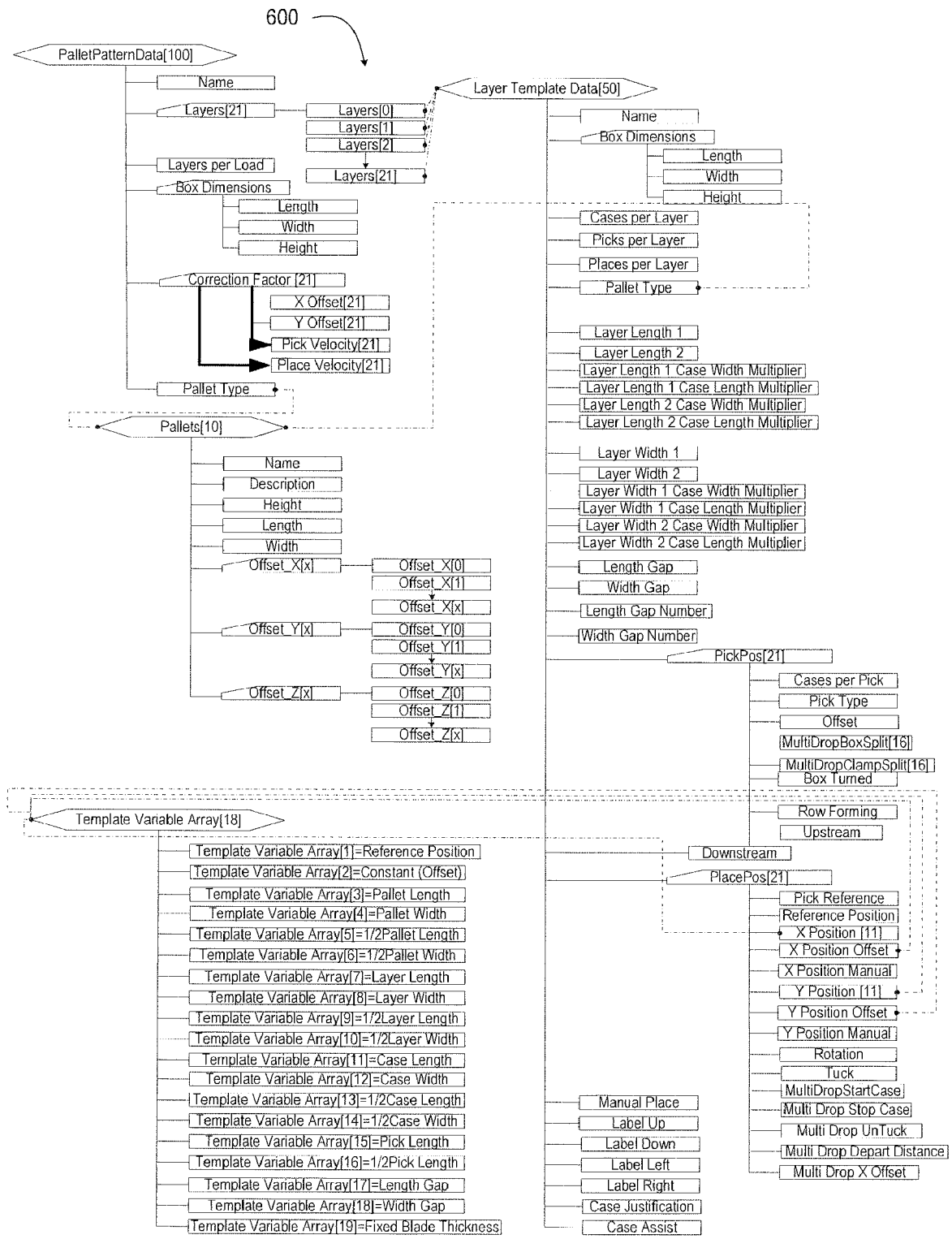
FIG. 6 illustrates a programmable logic controller (PLC) pattern data structure, according to one or more embodiments.

FIG. 6 illustrates a PLC pattern data structure 600.

Robot Pick Place Constants: System attributes that are used by the PLC to calculate position data must be entered as part of the setup prior to system operation. These values remain static in the PLC and only need to be entered as part of the initial setup. The Robot Constants Screen is accessed only by Admin, ROBOT CONSTANTS button is located at the bottom on the Load Configurator Screen. FIG. 7 illustrates the ROBOT CONSTANT Screen.

Pick Rotation Offset: The tool rotation can vary depending on the type of robot implemented and/or the mounting configuration of the tool. Rotation offset is used by the PLC to calculate position data. The offset will adjust for the condition when the tool is in the standard position, with the robot Z axis at 0 and the fixed blade is not on the left side perpendicular to the robots X axis.

Place Rotation Offset: The Place Rotation Offset is similar to the Pick Rotation Offset with the exception that the value is for all pick types.

Pointer Length: This value represents the length of the pointer used to teach the base frames of the robot.

Figure 8:
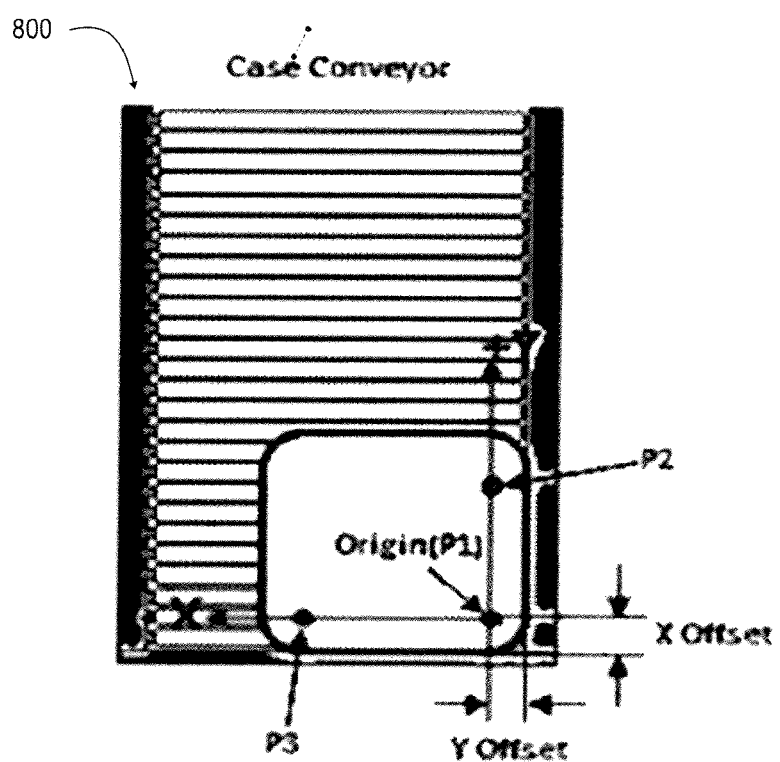
FIG. 8 illustrates a diagram of a case conveyor with the jig used to teach the base frame, according to one or more embodiments.

Line Conveyor X, Y and Z Offsets: The case conveyor base frame origin may not be exactly at the junction of the conveyor side guide and end plate; the offset values are used to account for this. FIG. 7 illustrates entries for multiple conveyor lines. The number of line offsets will be system specific. FIG. 8 illustrates a case conveyor with the jig used to teach the base frame, the offsets from the conveyor end and side frames to the taught origin are shown.

The line Pick X offset is the value it takes to get from the origin to the most downstream position of the case. The example in FIG. 8 would be −50 mm because one would need to subtract 50 mm from the origin to get to the end stop of the conveyor. The line Pick Y offset will be the value is takes to get from the origin the side of the case that it will be justified to when ready to pick. Looking that FIG. 8 if the case is justified to the right side the y offset would be −50 mm, if the case is justified to the left side of the conveyor the you would measure from the origin all the to the left side of the case that touches the guard rail. The Line Pick Z Offset Minimum Limit represents the minimum Z value that the PLC can calculate for the Z position in the conveyor base frame. This value is used to prevent the tool front hitting the conveyor. This can be calculated by jogging the robot down the lowest acceptable position to pick from and looking at the current robot Z position of the correct user frame.

Minimum Via Height: This value represents the minimum height the tool must be to travel from the Pick Depart position to the Place Approach position and back to the idle, or a new Pick Depart position. This value includes clearing obstacles such as other conveyors, and conveyors with cases upon them.

Maximum Via Height: This value represents the maximum height the tool is permitted to travel from the Pick Depart position to the Place Approach position and back to the idle, or a new Pick Depart position. This value includes clearing obstacles such as other conveyors, conveyors with cases upon them, pallet builds in progress or complete, and the maximum height the arm can raise without the tool hitting the robot body.

Base Frame Delta: This value is the difference between the Z axis values of the conveyor base frame and the pallet conveyor base frames.

Robot Tool Constants: The Robot Tool attributes used by the PLC to calculate position data must be entered as part of the setup prior to system operation. These values remain static in the PLC and only need to be entered as part of the initial setup. The Robot Tool Constants Screen is accessed only by Admin or ENGINEER. TOOL DATA button is located at the bottom on the Load Configurator Screen. FIG. 9 or FIG. 10 illustrates the Robot Tool Constants Screen 900, 1000 respectively. There are two type of robot tool—Clamp Tool and Vacuum Tool. Tool type can be changed by pressing Clamp Tool Selected or Vacuum Tool Selected button.

Tool Y Offset (mm): This value is the distance from the origin (center) the robot's wrist flange to the inside face of the fixed blade.

Clamp or Foam Depth (mm): This value is used to enter the depth of clamps or Vacuum Foam on the tool.

Number of Clamps or Zones: This value is used to enter the number of clamps or vacuum zones on the tool.

Fixed Blade Thickness or Vacuum Tool Width (mm): The Fixed blade thickness or vacuum tool width needs to be entered.

Clamp or Zone Lengths (mm): Clamps or Zones can have different lengths. The length of each individual clamp or zone needs to be entered.

Clamp Gaps (mm): The tool can have different gaps between the clamps. The length of each individual gap needs to be entered.

Robot Tool Sensors: Robot Tool Sensors are mounted on the robot tool towards the fixed blade side. These sensors are used to determine which clamp is used to pick the case or which case has which clamp. The Robot Tool Sensor button is located at the bottom on the Robot Tool Constants Screen. Enter the number of sensors used for the robot tool. The sensor distance is measured from the top of the tool. Once the distance for each sensor is measured, enter those values into the Sensor Distance field.

Pallet Setup Screen: Pallets are stored in a pallet data array. Pallets are assigned to a. pallet build when creating loads. The PLC uses the pallet data to calculate place position values. Pallet Data can be entered or modified on this screen. New data is entered by moving down the list to a blank entry. Existing data is modified by selecting the desired. Pallet and changing the data. Modified data will highlight yellow. Pressing the Save pushbutton will save the data, the Cancel button will revert the data back to the original value. Pallet Data can be deleted by pressing DELETE PALLET button. Confirmation will pop up to confirm whether user wants to delete the pallet data or not.

Pallet Dimensions: The length, width, and height pallet dimensions are entered as part of the pallet data. The pallet height is used by the PLC to calculate place position data.

Line Pallet Place Offsets: The pallet conveyor base frame origin will not be exactly at the lower right hand corner of the pallet; the offset values are used to account for this. The number of line offsets will be system specific. For example the base frame for a pallet conveyor was taught at the base position and the pallet position is placed. The offset values correct for the lower right hand corner being displaced from the base origin.

Layer Template Utility: The Layer Template Utility screen is used to enter layer template data generated in AutoCAD (Section 0). Since Pallet Patterns are made up of a combination of layers, it is generally easier to enter the layer template data first. Data can be entered or modified on this screen. New data is entered by moving down the list to a blank entry. Existing data is modified by selecting the desired layer and changing the data. Modified data will highlight yellow. Pressing the Save pushbutton will save the data, the Cancel button will revert the data back to the original value.

Pick data is entered by entering the desired pick number in the Pick/Layer Number field. Place data is entered by entering the desired place numbers in the Places/Layer Number filed, Box Dimensions can also be entered on this screen in the Length, Width and Height field. The default unit of dimension is in mm, an option is also available to convert the units to inches.

A Copy Layer function is available to allow for quick duplication of data from one layer to a new layer. The data can be copied and then modified as necessary. A Delete Layer function is available to delete the selected layer data. If Delete Layer is pressed, a confirmation screen will pop up which will ask the user to confirm deleting the selected layer.

A Template Search function is available to search the Template data base with user entered search criteria. From this screen user can go to PATTERN UTILITY, PICK UTILITY, HELP, and MENU SCREEN.

Pick Utility: The Pick Utility Screen is used to setup the pick type. Enter the Pick number in Pick Number field and number of cases for that respective pick in Cases/Pick field. Select the Fixed Blade position, whether it's on left side or right side. If fixed blade is on left side. Select the robot tool position, whether it's upstream or downstream. If Clamp Gap or Case Split is selected on Clamp Select screen, the upstream option will go away. If these options are selected all calculations will use the downstream algorithms.

Case Justification Select the case conveyor justification, whether the cases are coming on left side of the conveyor or right side of the conveyor.

Case Assist Enable—if case assist enable is selected, then case assist solenoid will be on whenever the boxes are turned and box turn solenoid is on for that layer.

Boxes Turned—If Boxes Turned is selected, then boxes will be turned at infeed conveyor with help of case turned solenoid when using a row former.

Row Forming—If Row Forming is selected, then another row of boxes will be formed on infeed conveyor.

Labels—label position can be selected depending on which side the label is present on the box.

From Pick Type Utility Screen, user can go to Clamp/Vacuum Select, Tool Data, and Template Utility Screen.

Clamp Select: Clamp Select Screen is used to select the gap between the clamps or zone for selected pick number. If the pick is multidrop, then select the cases split depending on which cases going to be dropped. For example, if case 1 and case 2 are in place 1 drop and case 3 is in place 2 drop position, then select the case split 2-3.

Load Configurator: The Load Configurator Utility Screen is used to enter Load Pattern Data. Data can be entered or modified on this screen. New data is entered by moving down the list to a blank entry. Existing data is modified by selecting the desired pallet build and changing the data. Modified data will highlight yellow. Pressing the Save pushbutton will save the data, the Cancel button will revert the data back to the original value.

Box Dimension: Enter the box dimensions—length, width and height in box dimensions field. The default unit for dimensions is mm, if user wants to change it into inches, press the Unit/in button. If load is based on pattern, then box length and width will be locked and user will not able to modify it once it entered (these can only be modified under the template utility, once they are changed the user will need to update all place positions).

Master Vel: Is the maximum speed this pattern will run. It is usually set to 100%, but it can be reduced if necessary.

Pick Velocity is the speed at which the robot will approach and depart the pick position. It is usually set to 100%, but it can be reduced if necessary. The pick velocity can be different for each pick.

Place Velocity is the speed at which the robot will approach and depart the place position. It is usually set to 100%, but it can be reduced if necessary. The place velocity can be different for each place and can be different too if it's multidrop. Note: If these velocities are left at 0% the general robot speed will be used.

The place position correction factor can be used to accommodate difficult to handle product where the place position needs to be slightly off of the calculated position.

Place X Offset is the amount the place moves in the X direction.

Place Y Offset is the amount the place moves in the Y direction.

Since this is a correction factor, it only applies to one specific place on one specific layer. It does not affect the entire pallet pattern. The Layer Number and Place Number data determine the specific place affected within the pallet pattern.

The load layers can be selected as Template based or Pattern based. If the load is pattern based, the Assign Template button will he invisible and vice versa. Select the layer to use from the template based or pattern based load configurator list or enter the layer number for the applicable layer.

Once all data is entered or modified, Press the save button to save changes.

Assign Speeds function is available for each load individually. If Assign Speeds button is pressed, assign speeds screen will pop up where user can enter the speed for infeed and row former conveyor speeds.

A Delete Pattern function is available to delete Load data from Load Pattern database.

From this screen user will be able to go to the Template Utility, Robot Constants, Tool Data, or Pallet data screen.

Line Status: The Line Status screen is used to monitor the status of each line conveyor data. He/she can enable or disable the pick, reject load, end the current run load. There are some function which are only assessable in Admin Mode, such as Simulation Mode, manual selection of Layer number, pick number, and place number.

The user can change the Robot speed by pressing Robot speed, and robot speed screen will pop up. On robot speed screen, user can see the maximum speed set for each line and robot speed. The Robot Speed is percentage of Master velocity which is entered on Load Configurator screen. For example, if master velocity is 35% for the active line and robot speed is 25%, then robot will run at 25%. It will then look to see if the pick or place velocity is lower than 25% and if so will reduce its speed to that setting.

Line Setup: The Line Setup screen is used to assign the load for that line to run. The Load can be selected by moving up and down to the desired load and then press the Accept Assignment. A new assignment can only be loaded if the current line does not have an assignment, and. End Of Run must be performed to clear out the data and no pallet must be present on the build conveyor.

Pallet Conveyor Screen: Pallet Conveyor screen is used to monitor pallet build and discharge conveyors, pallet present on conveyors or not. Also Pallet Build and Discharge conveyors can be jogged from this screen. If Infeed and/or Discharge Light curtain is blocked, then light curtain sensors will blink red. If Jog Control is pressed, Jog control screen will pop up Robot Control: The Robot Control screen is used to enable End Effector Manual mode and Drop Detect as well as to control different functions of the robot. If System is in Manual Mode and End Effector is in manual triode, then user can open or close the clamps individually or together. If Drop Detect is enable, then the robot tool sensors will detect that all the cases are in clamps or not. If any case is missing or drop from the clamp, then it will give a Drop Detect Fault and will ask user to complete the place operation or not. If user presses yes, then robot will complete the place operation and robot will then hold for cases to be adjusted or added. Once everything is cleared, press Start Robot button and robot will start operation from where it was left.

Security Log Screen: The Security Log Screen is accessed only in ADMIN MODE, and is used to check security log, create new user, modify existing user, and change user properties.

Alarm History Screen: The Alarm History Screen is used to check the history of all system alarms and faults that occurred. The alarm can be filtered as System Fault, Safety Fault, Robot Fault, Conveyor Fault, and Pallet Fault. Alarm history can be cleared only in Engineer or Admin Mode. All Faults can be reset from this screen too.

Template Search Screen: Template Search Screen is used to search the Template database with user entered Search Criteria. To access the Template Search screen, press Template Search button on Template Utility screen. Enter the box length and width in box length and box width field. Also enter the minimum and maximum layer length and width into minimum and maximum layer length and width field respectively. Once all the data is entered, press the Search button. If there are any Templates that match with user Criteria, it will be listed according to descending order of maximum number of cases per layer. User can preview the layer before selecting it to verify correct formation.

Simulation Mode The Simulation Mode screen is accessible only in ADMIN MODE. This screen is used to test the robot movements and position in simulation mode without running case conveyor or pallet conveyor, even though the system is in Auto Mode. To use the simulation mode, system needs to be Auto Mode and Pick Photo Eye must be clear. Robot can be tested for each pick separately by pressing Ready To Pick each time or Robot can be tested for whole layer by pressing Ready to Force button.

Figure 11:
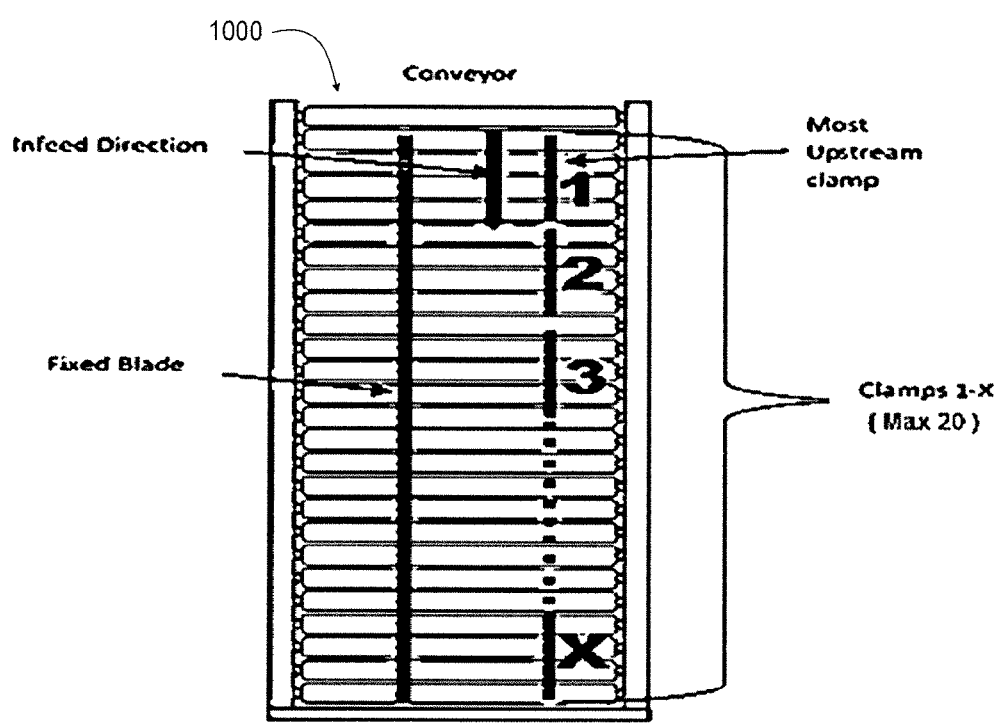
FIG. 11 illustrates an HMI depiction 1100 of a case conveyor with superimposed end effector clamps for configuring pick of multiples articles, according to one or more embodiments.
Figure 12A:
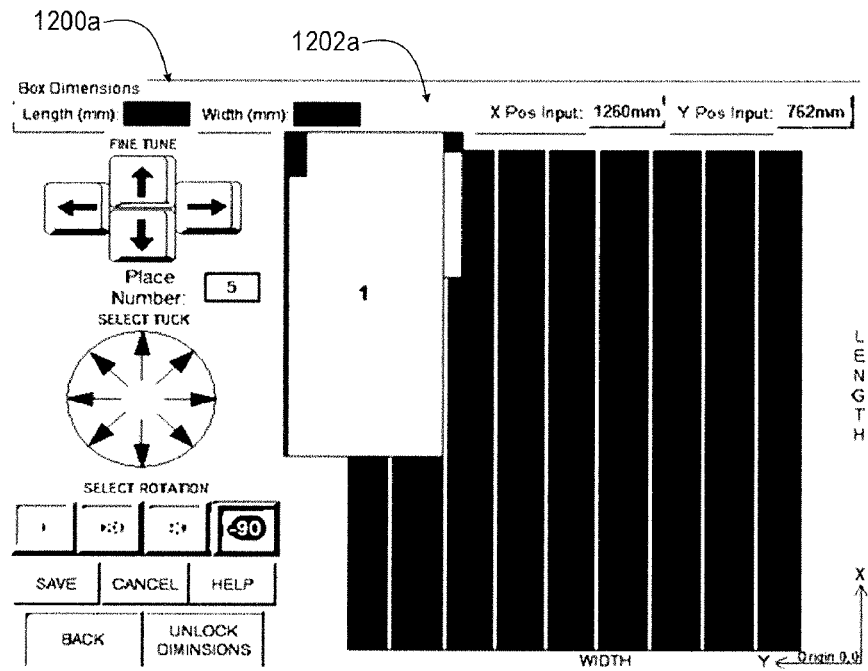
FIGS. 12A-12F illustrate sequential HMI depictions for defining patterns of articles, according to one or more embodiments.
Figure 12B:
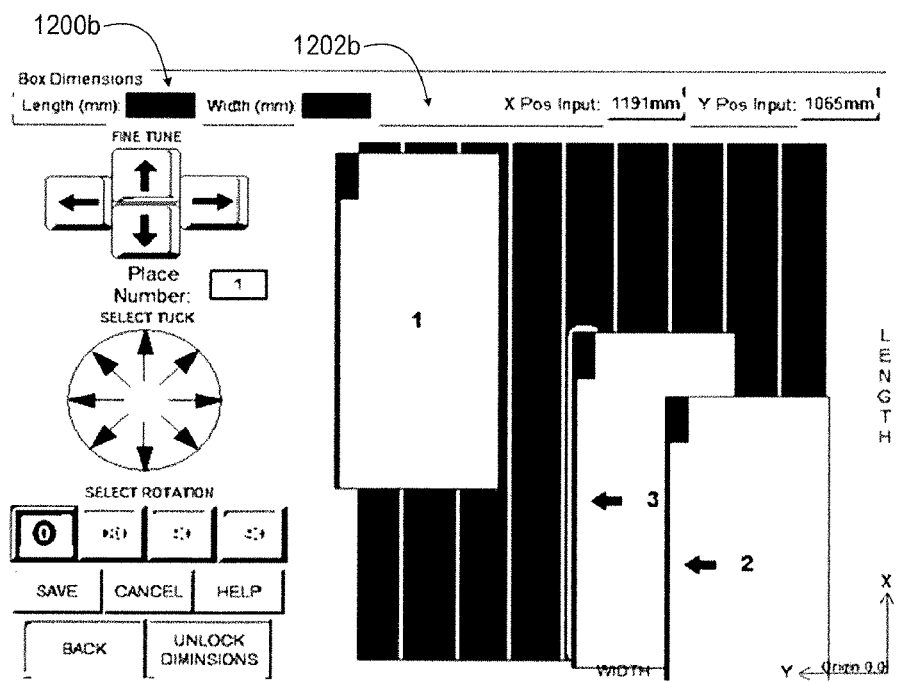
Figure 12C:
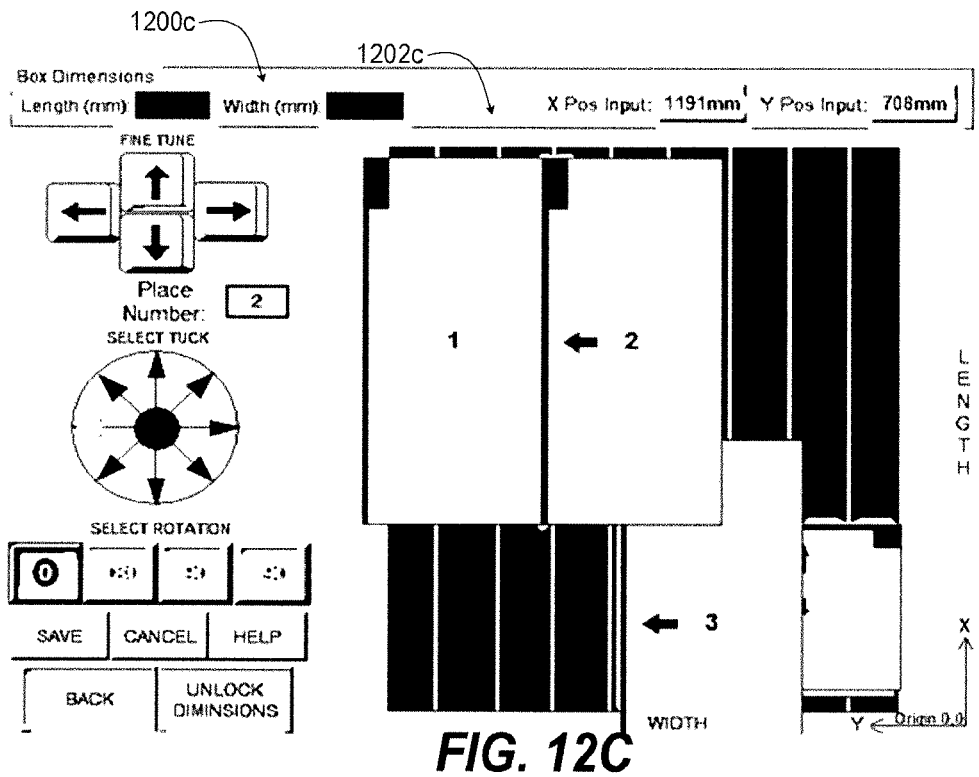
Figure 12D:
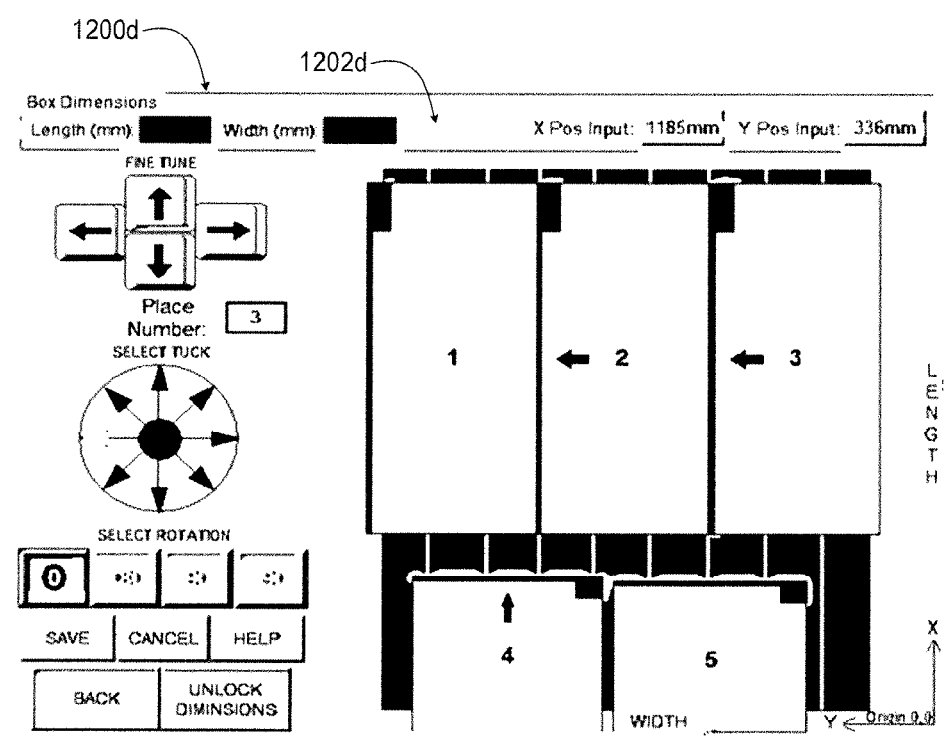
Figure 12E:
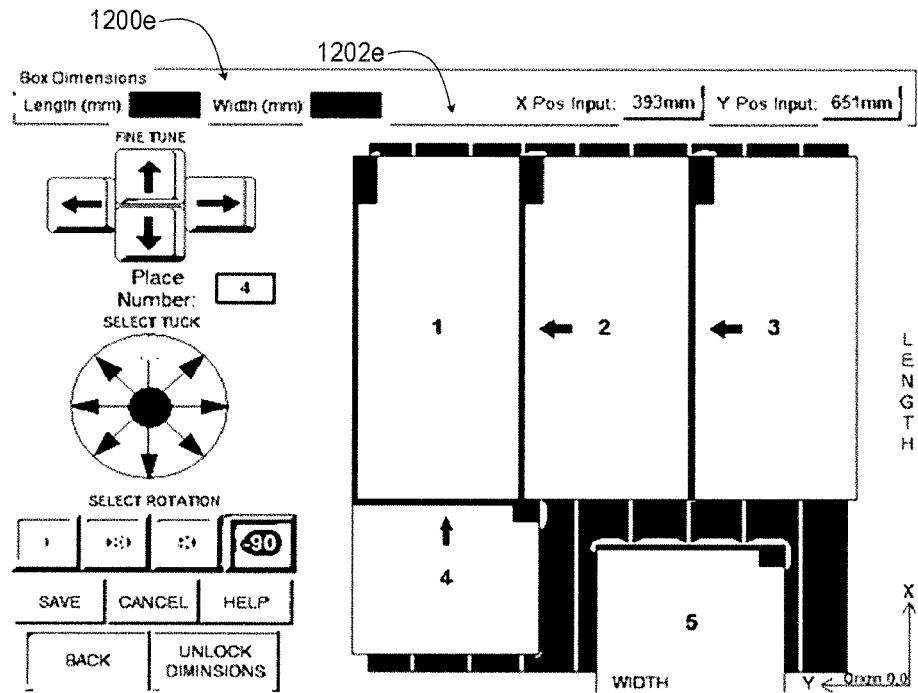
Figure 12F:
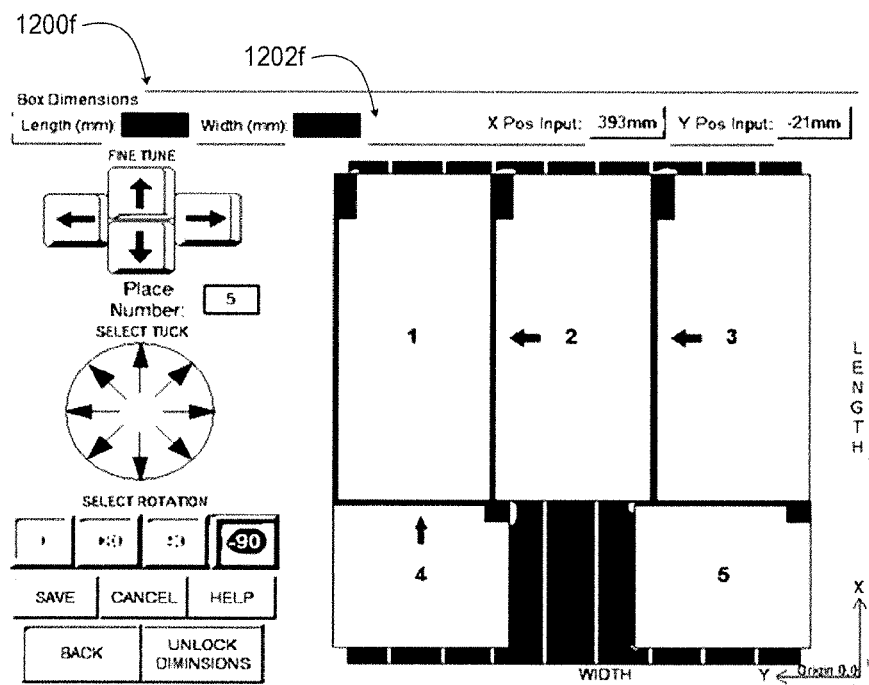

FIG. 11 illustrates an HMI depiction 1100 of a case conveyor with superimposed end effector clamps for configuring pick of multiples articles.

FIGS. 12A-12F illustrates a sequence of HMI depictions 1200a-1200f of building a pattern 1202a-1202f.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", " " and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of creating a multidrop pattern of articles for robotic placement in layers on a pallet, the method comprising:
   receiving a first user input indicating a first placement position of a first subset of more than one article for placement on the pallet;
   receiving a second user input indicating a second placement position of a second subset, which is mutually exclusive of the first subset, of the more than one article; and
   converting the first and second user inputs into a place sequence of robotic control operations to perform a multidrop operation of the more than one article by a robotic arm.

2. The method of claim 1, wherein receiving the first and second user inputs comprises receiving a drag and drop input via a user interface.

3. The method of claim 1, wherein receiving the first and second user inputs comprises receiving numeric values.

4. The method of claim 1, further comprising:
   presenting on a user interface a case conveyor depiction of a case conveyor and the more than one article arrayed on the case conveyor,
   presenting on the user interface an end effector depiction of independently controllable zones of an end effector;
   receiving a third user input indicating a superimposed position of the independently controllable zones on the case conveyor;
   receiving a fourth user input indicating an engagement status of each independently controllable zone to engage a respective one or more of the more than one article; and
   converting the third and fourth user inputs into a pick sequence of robotic control operations to perform the multidrop operation by the robotic arm.

5. The method of claim 4, further comprising:
   presenting a control interface, wherein presenting the control interface comprises soliciting a position for a zone gap relative to the more than one article;
   receiving a fifth user input indicating the relative position for the zone gap; and
   converting the third, fourth and fifth user inputs into the pick sequence.

6. The method of claim 4, further comprising:
   moving the end effector to a pick approach position;
   moving the end effector to a pick offset position;
   moving the end effector to a pick position;
   actuating selected ones of the independently controllable zones of the end effector to engage the more than one article;
   moving the end effector to a first pick depart position;
   moving the end effector to a first place approach position;
   moving the end effector to a first place tuck position;
   moving the end effector to a first place position;
   deactuating one or more independently controllable zones that correspond to the first subset of more than one article;
   moving to a second place depart position;
   moving to second place approach position;

moving the end effector to a second place tuck position;
moving the end effector to a second place position; and
deactuating one or more independently controllable zones that correspond to the second subset of more than one article to place.

7. The method of claim 4, wherein presenting the end effector depiction comprises presenting pairs of clamps.

8. The method of claim 4, wherein presenting the end effector depiction comprises presenting vacuum zones.

9. A controller comprising:
a user interface device;
a device interface in communication with a robotic arm having an end effector, and
a processor subsystem in communication with the user interface device and device interface to:
receive a first user input indicating a first placement position of a first subset of more than one article;
receive a second user input indicating a second placement position of a second subset, which is mutually exclusive of the first subset, of the more than one article; and
convert the first and second user inputs into a place sequence of robotic control operations to perform a multidrop operation of the more than one article by the robotic arm.

10. The controller of claim 9, wherein the processor subsystem receives the first and second user inputs as a drag and drop input via the user interface device.

11. The method of claim 9, wherein the processor subsystem receives the first and second user inputs as numeric values via the user interface device.

12. The controller of claim 9, wherein the processor subsystem:
presents on the user interface device a case conveyor depiction of a case conveyor and the more than one article arrayed on the case conveyor;
presents on the user interface device an end effector depiction of independently controllable zones of the end effector;
receives a third user input indicating a superimposed position of the independently controllable zones on the case conveyor,
receives a fourth user input indicating an engagement status of each independently controllable zone to engage a respective one or more of the more than one article; and
converts the third and fourth into a pick sequence of robotic control operations to perform the multidrop operation by the robotic arm.

13. The controller of claim 12, wherein the processor subsystem:
presents a control interface, wherein presenting the control interface comprises soliciting a position for a zone gap relative to the more than one article;
receives a fifth user input indicating the relative position for the zone gap; and
converts the third, fourth and fifth user inputs into the pick sequence.

14. The controller of claim 12, wherein the processor subsystem via the device interface executes the pick and place sequences of robotic control operations by:
moving the end effector to a pick approach position;
moving the end effector to a pick offset position;
moving the end effector to a pick position;
actuating selected ones of the independently controllable zones of the end effector to engage the more than one article;
moving the end effector to a first pick depart position;
moving the end effector to a first place approach position;
moving the end effector to a first place tuck position;
moving the end effector to a first place position;
deactuating one or more independently controllable zones that correspond to the first subset of more than one article;
moving to a second place depart position;
moving to second place approach position;
moving the end effector to a second place tuck position;
moving the end effector to a second place position; and
deactuating one or more independently controllable zones that correspond to the second subset of more than one article to place.

15. The controller of claim 12, wherein the processor subsystem presents the end effector depiction as pairs of clamps on the user interface device.

16. The controller of claim 12, wherein the processor subsystem presents the end effector depiction as vacuum zones on the user interface device.

17. A material handling system comprising:
a robotic arm having an end effector for placing more than one article on a pallet;
a user interface device;
a controller in communication with the robotic arm having the end effector; and
a processor subsystem in communication with the user interface device and the controller to:
receive a first user input indicating a first placement position of a first subset of more than one article;
receive a second user input indicating a second placement position of a second subset, which is mutually exclusive of the first subset, of the more than one article; and
convert the first and second user inputs into a place sequence of robotic control operations to perform a multidrop operation of the more than one article by the robotic arm.

18. The material handling system of claim 17, wherein the controller:
presents on the user interface device a case conveyor depiction of a case conveyor and the more than one article arrayed on the case conveyor;
presents on the user interface device an end effector depiction of independently controllable zones of the end effector,
receives a third user input indicating a superimposed position of the independently controllable zones on the case conveyor;
receives a fourth user input indicating an engagement status of each independently controllable zone to engage a respective one or more of the more than one article;
solicits a position for a zone gap relative to the more than one article; and
receives a fifth user input indicating the relative position for the zone gap; and
converts the third, fourth and fifth user inputs into a pick sequence of robotic control operations to perform the multidrop operation by the robotic arm.

19. The material handling system of claim 17, wherein the controller executes the pick and place sequences of robotic control operations by:
moving the end effector to a pick approach position;
moving the end effector to a pick offset position;
moving the end effector to a pick position;

actuating selected ones of the independently controllable zones of the end effector to engage the more than one article;
moving the end effector to a first pick depart position;
moving the end effector to a first place approach position;
moving the end effector to a first place tuck position;
moving the end effector to a first place position;
deactuating one or more independently controllable zones that correspond to the first subset of more than one article;
moving to a second place depart position;
moving to second place approach position;
moving the end effector to a second place tuck position;
moving the end effector to a second place position; and
deactuating one or more independently controllable zones that correspond to the second subset of more than one article to place.

20. The material handling system of claim 17, wherein:
the end effector is selectably configurable with a selected one of: (i) an end effector having pairs of clamps; and (ii) an end effector having vacuum actuators; and
the controller:
  presents a control interface to configure a depicted end effector as a selected one of the end effector having the pairs of claims and the end effector having the vacuum actuators; and
  presents the control interface to select a number of independently controllable zones.

* * * * *